(12) United States Patent
Moon et al.

(10) Patent No.: US 7,283,720 B2
(45) Date of Patent: *Oct. 16, 2007

(54) RECORDING MEDIUM FOR STORING VIRTUALLY DELETED STILL PICTURE INFORMATION, RECORDING AND/OR REPRODUCING METHOD AND APPARATUS THEREFOR

(75) Inventors: Seong-jin Moon, Suwon (KR); Young-nam Oh, Sungnam (KR); Tae-yun Chung, Gwacheon (KR); Jung-suk Kang, Seoul (KR); Pan-gie Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1138 days.

This patent is subject to a terminal disclaimer.

(21) Appl. No.: 10/137,366

(22) Filed: May 3, 2002

(65) Prior Publication Data

US 2002/0122657 A1    Sep. 5, 2002

Related U.S. Application Data

(62) Division of application No. 09/339,190, filed on Jun. 24, 1999, now Pat. No. 6,757,476.

(30) Foreign Application Priority Data

Jun. 24, 1998  (KR)  .................................. 98-23991
Oct. 26, 1998  (KR)  .................................. 98-44804

(51) Int. Cl.
    *H04N 5/91* (2006.01)
(52) U.S. Cl. ........................... 386/46; 386/94; 386/124
(58) Field of Classification Search .................... 386/5, 386/46, 69, 83, 94–97, 117, 126; 360/60; 358/906, 909.1; 348/231, 232
    See application file for complete search history.

(56) References Cited

U.S. PATENT DOCUMENTS 4,703,369 A * 10/1987 Moriyama et al. ............ 386/97

(Continued)

FOREIGN PATENT DOCUMENTS

CN    1177816 A    4/1998

(Continued)

OTHER PUBLICATIONS

Reference AI (JP 9-17127) is substantially equivalent to Reference AG (EP 0751515).

(Continued)

*Primary Examiner*—John Miller
*Assistant Examiner*—Christopher Onuaku
(74) *Attorney, Agent, or Firm*—Stein, McEwen & Bui, LLP

(57) ABSTRACT

A recording medium for storing virtual deletion information, and recording and/or reproducing method and apparatus therefor are provided. The recording medium includes a first region having a plurality of still pictures, and a second region having first virtual deletion information for the still pictures, and still picture group information for separating the still pictures in the first region into a predetermined maximum number of groups in order to manage the still pictures at a group level, wherein the first virtual deletion information is within the still picture group information, and if the first virtual deletion information is set to a virtual delete state, the corresponding still picture is not to be reproduced. Accordingly, file extent information can be prevented from excessively increasing by maximally preventing a recording area from being scattered, when some of a data file are deleted by a user's request.

4 Claims, 26 Drawing Sheets

U.S. PATENT DOCUMENTS

| | | | |
|---|---|---|---|
| 5,555,098 A | 9/1996 | Parulski | |
| 5,659,745 A | 8/1997 | Inoue | |
| 5,838,967 A | 11/1998 | Okayama et al. | |
| 5,902,115 A | 5/1999 | Katayama | |
| 6,009,234 A | 12/1999 | Taira et al. | |
| 6,047,103 A * | 4/2000 | Yamauchi et al. | 386/94 |
| 6,088,507 A * | 7/2000 | Yamauchi et al. | 386/95 |
| 6,148,138 A * | 11/2000 | Sawabe et al. | 386/69 |
| 6,332,194 B1 | 12/2001 | Bloom et al. | |
| 6,757,476 B2 * | 6/2004 | Moon et al. | 386/46 |
| 6,778,755 B1 | 8/2004 | Moon et al. | |
| 6,873,785 B2 | 3/2005 | Moon et al. | |

FOREIGN PATENT DOCUMENTS

| | | |
|---|---|---|
| EP | 295 148 | 12/1988 |
| EP | 0545448 A1 | 8/1993 |
| EP | 730 272 A2 | 9/1996 |
| EP | 730 272 A3 | 9/1996 |
| EP | 737 974 A3 | 10/1996 |
| EP | 737974 A2 | 10/1996 |
| EP | 753 854 A2 | 1/1997 |
| EP | 753 854 A3 | 1/1997 |
| EP | 0751515 | 1/1997 |
| EP | 0 757 350 | 2/1997 |
| EP | 0965991 A1 | 12/1999 |
| JP | 63-079287 | 4/1988 |
| JP | 64-048285 | 2/1989 |
| JP | 01-204163 | 8/1989 |
| JP | 01-263714 | 10/1989 |
| JP | 4-188484 | 7/1992 |
| JP | 06-020443 | 1/1994 |
| JP | 6-067945 | 3/1994 |
| JP | 06-076031 | 3/1994 |
| JP | 6-76031 | 3/1994 |
| JP | 6-314176 | 11/1994 |
| JP | 08-036519 | 2/1996 |
| JP | 8-037638 | 6/1996 |
| JP | 8-287654 | 11/1996 |
| JP | 8-339194 | 12/1996 |
| JP | 8-340507 | 12/1996 |
| JP | 09-017127 | 1/1997 |
| JP | 9-17127 | 1/1997 |
| JP | 10-50034 | 2/1998 |
| JP | 10-050034 | 2/1998 |
| JP | 10-92155 | 4/1998 |
| JP | 10-125046 | 5/1998 |
| JP | 10-143978 | 5/1998 |
| JP | 11-317056 | 11/1999 |
| JP | 2000-004421 | 1/2000 |
| JP | 2001-176206 | 6/2001 |

OTHER PUBLICATIONS

Reference AJ (JP 10-050034) is substantially equivalent to Reference AA (US 6,009,234).

U.S. Patent No. 5,838,967, corresponds to Japanese Patent Publication 6-76031.

U.S. Patent No. 5,659,745 corresponds to Japanese Patent Publication 4-188484.

U.S. Patent No. 5,902,115 corresponds to Japanese Patent Publication 8-339194.

All references cited in the enclosed Chinese Office Action w/ English translation were previously cited in the IDS filed Sep. 14, 2004 in the above-identified application.

Office Action issued by Malaysian Patent Office in Malaysian Patent Application No. PI20022139 on Aug. 23, 2006.

EP 753854, cited in Malaysian Office Action dated Aug. 23, 2006, was previously submitted.

Office Action issued in Japanese Patent Application No. 2002-228012 on Sep. 12, 2006.

JP 6-076031, JP 6-020443, JP 1-263714, and JP 1-204163, cited in the Japanese Office Action issued on Sep. 12, 2006, were previously submitted.

Office Action issued in Japanese Patent Application No. 2004-134025 on Aug. 29, 2006.

JP 6-020443, previously submitted, is substantially equivalent to US 5,555,098, previously submitted.

JP 64-048285, JP 1-204163, JP 1-263714, and JP 6-076031 were previously submitted.

Reference AE (EP 0545446 A1) and AA (U.S. 5,555,098) are substantially equivalent to reference AI (JP 06-020443).

Reference AB (U.S. 5,838,967) is substantially equivalent to reference AJ (JP 06-076031).

Office Action issued in Japanese Patent Application No. 11-179073, on Feb. 7, 2006.

U.S. Appl. No. 11/281,491, filed Nov. 18, 2005, Seong-Jin Moon et al., Samsung Electronics Co., Ltd.

Office Action issued in Japanese Patent Application No. 2002-228014 on Sep. 6, 2005.

U.S. Appl. No. 10/756,421, filed Jan. 14, 2004, Seong-jin Moon, et al., Samsung Electronics Co., Ltd.

U.S. Appl. No. 10/945,946, filed Sep. 22, 2004, Seong-jin Moon, et al., Samsung Electronics Co., Ltd.

U.S. Appl. No. 10/842,690, filed May 11, 2004, Seong-jin Moon, et al., Samsung Electronics Co., Ltd.

U.S. Appl. No. 10/842,440, filed May 11, 2004, Seong-jin Moon, et al., Samsung Electronics Co., Ltd.

U.S. Appl. No. 10/756,422, filed Jan. 14, 2004, Seong-jin Moon, et al., Samsung Electronics Co., Ltd.

U.S. Appl. No. 10/756,423, filed Jan. 14, 2004, Seong-jin Moon, et al., Samsung Electronics Co., Ltd.

English Language Chinese Office Action for Chinese Divisional Patent Application No. 01122435.5, dated Jun. 11, 2004 (related to the present application).

Office Action issued in Japanese Patent Application No. 2004-134025 on May 9, 2006.

Japanese Office Action for Japanese Application No. 2000-321764, dated Sep. 2, 2003.

U.S. Appl. No. 09/339,190, filed Jun. 24, 1999, Seong-Jin Moon et al., Samsung Electronics Co., Ltd.

U.S. Appl. No. 09/592,109, filed Jun. 12, 2000, Seong-jin Moon, et al., Samsung Electronics Co., Ltd.

U.S. Appl. No. 09/592,110, filed Jun. 12, 2000, Seong-jin Moon, et al., Samsung Electronics Co., Ltd.

U.S. Appl. No. 10/020,979, filed Dec. 19, 2001, Seong-jin Moon, et al., Samsung Electronics Co., Ltd.

* cited by examiner

FIG. 15
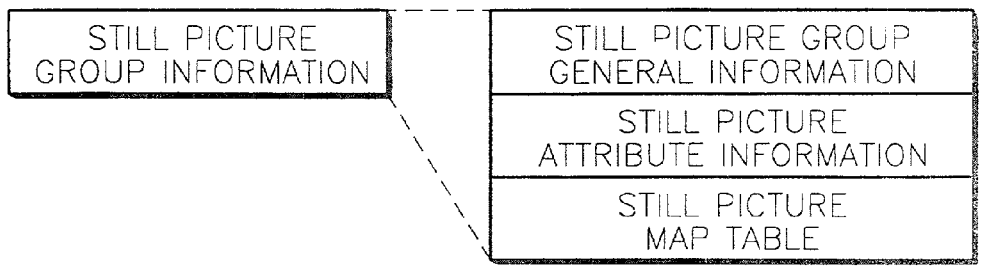
FIG. 16
|  | Contents | Number of Bytes |
|---|---|---|
|  | Reserved | 2 bytes |
| GVOB_ID | VOB Group ID | 2 bytes |
| GVOB_S_ADR | Start address of VOB Group | 4 bytes |
| GVOB_Ns | Number of Video Parts | 1 byte |
| GVOB_Ds | Number of Virtually deleted Video Parts | 1 byte |
FIG. 17
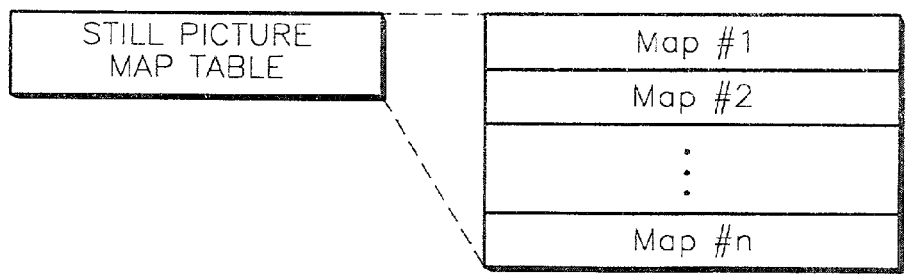

| | Contents | Number of Bytes |
|---|---|---|
| MAP_TY | Map type | 1 bit |
| VOB_ID | VOB ID | 7 bits |
| V_DELETE | Virtual Deleted Flag | 1 bit |
| V_PART_SZ | Size of Video part | 1 byte |
| GAOB_ID | GAOB ID for after_recorded audio | 12 bits |
| AOB_ID | AOB ID for after_recorded audio | 1 byte |

| | Contents | Number of Bytes |
|---|---|---|
| MAP_TY | Map type | 1 bit |
| | Reserved | 7 bits |
| A_PBTM | Playback Time of Audio | 2 bytes |
| A_PART SZ | Size of Audio part | 2 bytes |

| | Contents | Number of Bytes |
|---|---|---|
| | Reserved | 2 bytes |
| GAOB_ID | AOB Group ID | 2 bytes |
| GAOB_S_ADR | Start address of AOB Group | 4 bytes |
| GAOB_Ns | Number of Audio Parts | 1 byte |

| | Contents | Number of Bytes |
|---|---|---|
| AOB_ID | AOB ID | 7 byte |
| A_DELETE | Virtual Deleted Flag | 1 bit |
| A_PBTM | Playback Time of Audio | 2 bytes |
| A_PART_SZ | Size of Audio Part | 2 bytes |

FIG. 24

| | Contents | Number of Bytes |
|---|---|---|
| S_GVOB_ID | VOB Group ID for Still Picture | 2 bytes |
| S_VOB_ID | VOB ID for Start Still Picture | 1 byte |
| E_VOB_ID | VOB ID for END Still Picture | 1 byte |
| | Reserved | 5 bytes |

RECORDING MEDIUM FOR STORING VIRTUALLY DELETED STILL PICTURE INFORMATION, RECORDING AND/OR REPRODUCING METHOD AND APPARATUS THEREFOR

CROSS-REFERENCE TO RELATED APPLICATIONS

This application is a divisional of application Ser. No. 09/339,190, filed Jun. 24, 1999, now U.S. Pat. No. 6,757,476, and claims the benefit of Korean Application No. 98-23991, filed Jun. 24, 1998 and Korean Application No. 98-44804, filed Oct. 26, 1998, in the Korean Patent Office, the disclosures of which are incorporated herein by reference.

BACKGROUND OF THE INVENTION

1. Field of the Invention

The present invention relates to recording and/or reproducing information, for effectively processing a still picture, and more particularly, to a recording medium for storing virtual deletion information for preventing file extent information from excessively increasing when some of a data file is deleted by a user's request, and recording and/or reproducing method and apparatus therefor.

2. Description of the Related Art

FIG. 1 shows a connection structure for various kinds of information in a moving picture and moving picture data, in recording/reproducing audio and/or video data on a recordable and/or rewriteable recording medium, specifically, a digital versatile disk (DVD), and more precisely, it illustrates the relationship between program chain (PGC) information 11 for treating data logically, moving picture information 12 including video object (VOB) information, and a moving picture data file 13 in which actually compressed audio/video (A/V) data are recorded in VOB units.

First, terms used throughout the specification will now be described. Supposing a movie was recorded in first and second parts, the overall movie is a program chain (PGC) and the first and second parts are programs. Also, each program can be defined by further dividing the same into several cells called sub-units. The information in each cell can wholly or partially define a video object (VOB). In such an event, each cell is used as a basic accessing unit during reproduction, and the program and PGC are only the information for connectivity between a plurality of cells.

Also, since data is actually sub-divided into video object units (VOBUs) and recorded in a moving picture data file, the VOB information includes various kinds of information relating to the VOBU data, that is, VOBU #1, VOBU #2, . . . and the VOB data in the moving picture data file is accessed by the VOB information. Here, the VOB data is used as a random access unit of a disk recording/reproducing apparatus. The VOBU is based on a single GOP (Group of Pictures) in the case of an MPEG (Moving Picture Experts Group) video, and audio data corresponding to video data is collected, that is, A/V data is multiplexed into sectors, to constitute a VOBU.

The data format shown in FIG. 1 is concerned with the moving picture, in which the unit of actual data, the VOB, comprises moving picture data for a fixed period of time. Synchronization or encoding of A/V signals is performed in units of VOBs. However, in the case of a still picture, each VOB constitutes a still picture. When a VOB is designated in a cell structure, a cell is necessary for each still picture. Thus, as more still pictures are recorded, more information is added.

Generally, data errors may be generated if data is recorded on a recordable disk a predetermined number of times. Thus, there is a limit in the number of times for rewriting data on a disk. All information is stored in the memory of a controller for controlling the system for the purpose of limiting the number of recording times and rapidly accessing data. However, as described above, in the case of a still picture, if the amount of information is increased, much time is required for reading the information. Also, there is a limit to the amount of information that can be stored in a memory with a limited size. Accordingly, it is not possible to record a large-capacity still picture.

In a two-dimensional recording medium such as a disk, a file may be distributed in physically fragmented spaces to then be recorded, and information which connects the scattered areas is recorded in a file system as file extent information. File extent information is information for logically connecting a file having the scattered areas and generally represents the scattered areas sequentially as start positions and lengths of data. Referring to FIG. 2, for example, a file is distributed and recorded in two parts, each represented by a start position and length of data in the file extent information. If a portion indicated by "A" shown in FIG. 2 is deleted so that the file is distributed in three parts, the amount of file extent information is increased, as shown in FIG. 3.

In other words, as shown in FIG. 3, the amount of file extent information is determined according to the level of fragmentation of a file, irrespective of the size of the file. Therefore, when a plurality of still pictures are recorded in a file, if some still pictures are deleted by a user's request, thus causing fragmentation of the file, the amount of the file extent information is sharply increased.

SUMMARY OF THE INVENTION

To solve the above problems, it is a first object of the present invention to provide a recording medium for grouping a plurality of large-capacity still pictures for the purpose of managing the same at a still picture group level, and for storing still picture group information containing information for virtually deleting a desired still picture.

It is a second object of the present invention to provide a recording medium for grouping a plurality of additional audio data other than original audio data added to still picture data, for the purpose of managing the same at an additional audio group level, and for storing additional audio group information containing information for virtually deleting additional audio data.

It is a third object of the present invention to provide a recording and/or reproducing method and apparatus for grouping a plurality of a large-capacity still pictures and incorporating virtual deletion information into the information managed at a still picture group level for the purpose of virtually deleting a desired still picture and original audio data corresponding thereto.

It is a fourth object of the present invention to provide a recording and/or reproducing method and apparatus for grouping a plurality of additional audio data relating to still pictures and incorporating virtual deletion information into the information managed at an additional audio group level for the purpose of virtually deleting the additional audio data corresponding to the virtually deleted still picture.

Additional objects and advantages of the invention will be set forth in part in the description which follows and, in part, will be obvious from the description, or may be learned by practice of the invention.

To achieve the first object, there is provided a recording medium including a first region having a plurality of still pictures, and a second region having first virtual deletion information for the still pictures, and still picture group information for separating the still pictures in the first region into a predetermined maximum number of groups in order to manage the still pictures at a group level, wherein the first virtual deletion information is within the still picture group information, and if the first virtual deletion information is set to a virtual delete state, the corresponding still picture is not to be reproduced.

To achieve the second object, there is provided a method for recording and/or reproducing audio and/or video data on a recordable and/or rewriteable recording medium including (a) recording a plurality of input still pictures, and (b) separating the plurality of still pictures into a predetermined maximum number of groups, and recording still picture group information having first virtual deletion information for the respective still pictures set to a virtual delete state by a user and playback information related to reproduction.

Also, the method according to the invention further includes the steps of reading the still picture group data to be reproduced in accordance with the playback information, and calculating the position of a desired still picture in accordance with the read still picture group data and reproducing still picture data located at the calculated position, while not reproducing still picture data having the first virtual deletion information contained in the read still picture group data set to a virtual delete state.

The apparatus according to the present invention includes a recording processor for signal-processing a plurality of still pictures to be recorded in a first region of the recording medium, and a controller for controlling first virtual deletion information for still pictures set to a virtual delete state by a user, the first virtual deletion information contained within still picture group information for separating the still pictures in the first region into within a predetermined maximum number of groups in order to manage the still pictures at a group level, for generating playback information related to a reproduction order, and for controlling the generated playback information to be recorded in a second region of the recording medium.

According to another aspect of the invention, the apparatus further includes a playback processor for reproducing still picture data in the first region based on the still picture group information in the second region, while not reproducing still picture having the first virtual deletion information set to a virtual delete state.

BRIEF DESCRIPTION OF THE DRAWINGS

The above objects and advantages of the present invention will become more apparent by describing in detail preferred embodiments thereof with reference to the attached drawings in which:

FIG. 15 illustrates the structure of still picture group information according to the present invention;

FIG. 16 is a table showing an example of the detailed contents of the still picture group general information shown in FIG. 15;

FIG. 17 illustrates the structure of a map table for a still picture shown in FIG. 15;

FIG. 24 is a table showing an example of the detailed contents of cell information for the still picture shown in FIGS. 9 and 10;

DETAILED DESCRIPTION OF THE PREFERRED EMBODIMENTS

Figure 1:
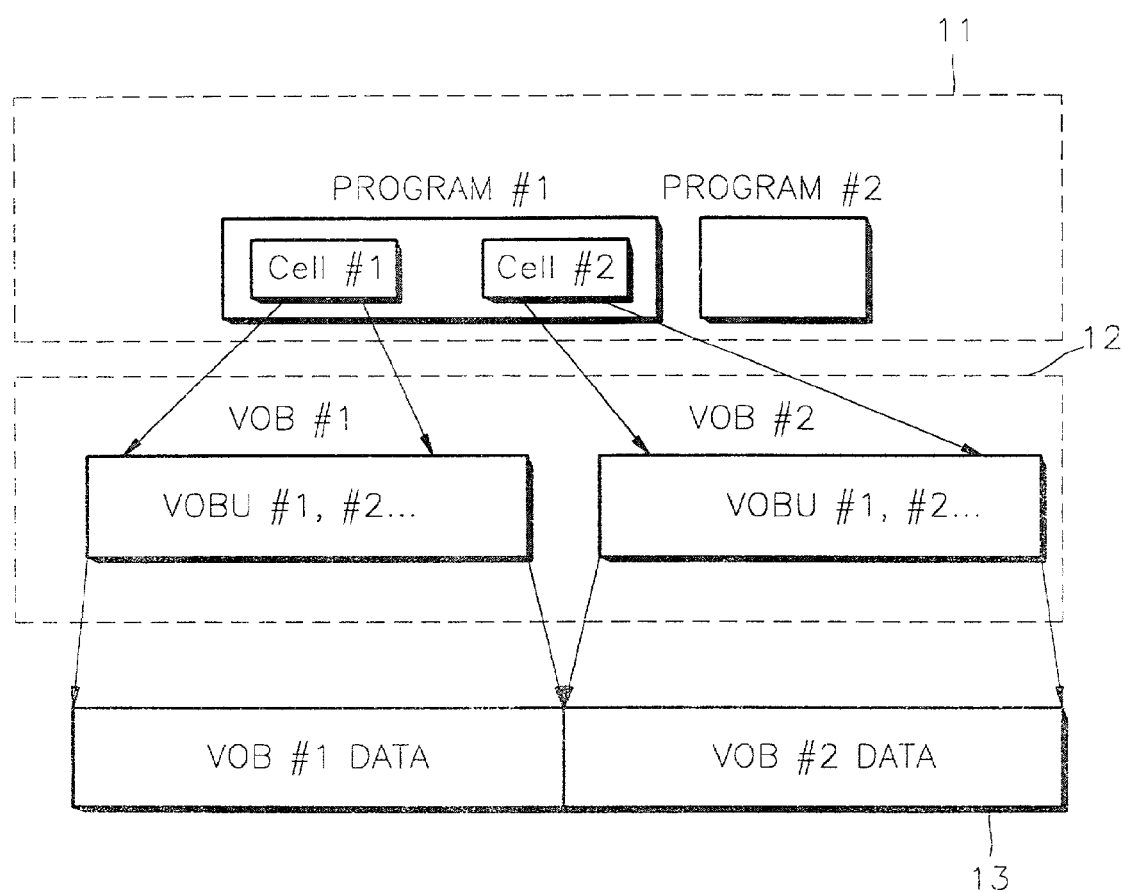
FIG. 1 illustrates a connection structure for various kinds of information and data in a moving picture.
Figure 2:
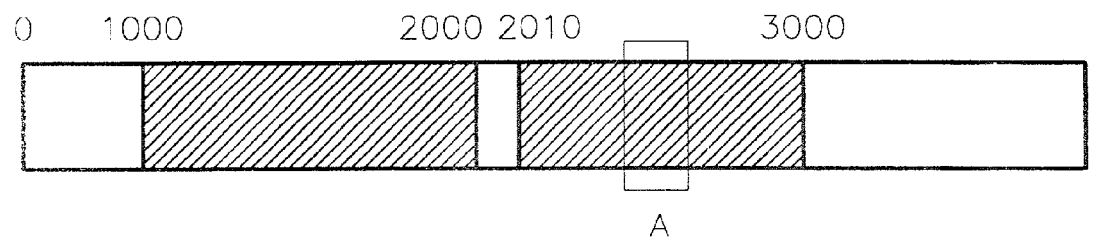
FIG. 2 shows an example of file recording positions and file extent information.
Figure 3:
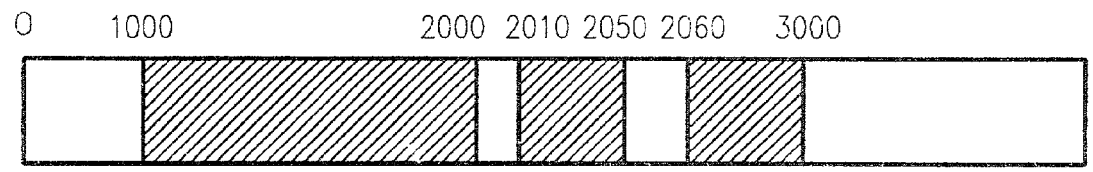
FIG. 3 illustrates the relationship between the distribution of a file and the file extent information.

Hereinafter, preferred embodiments of recording media for storing virtual deletion information for a still picture, and a recording and/or reproducing method and apparatus therefor, examples of which are illustrated in the accompanying drawings, wherein like reference numerals refer to the like elements throughout. The embodiments are described below in order to explain the present invention by referring to the figures.

Figure 4:
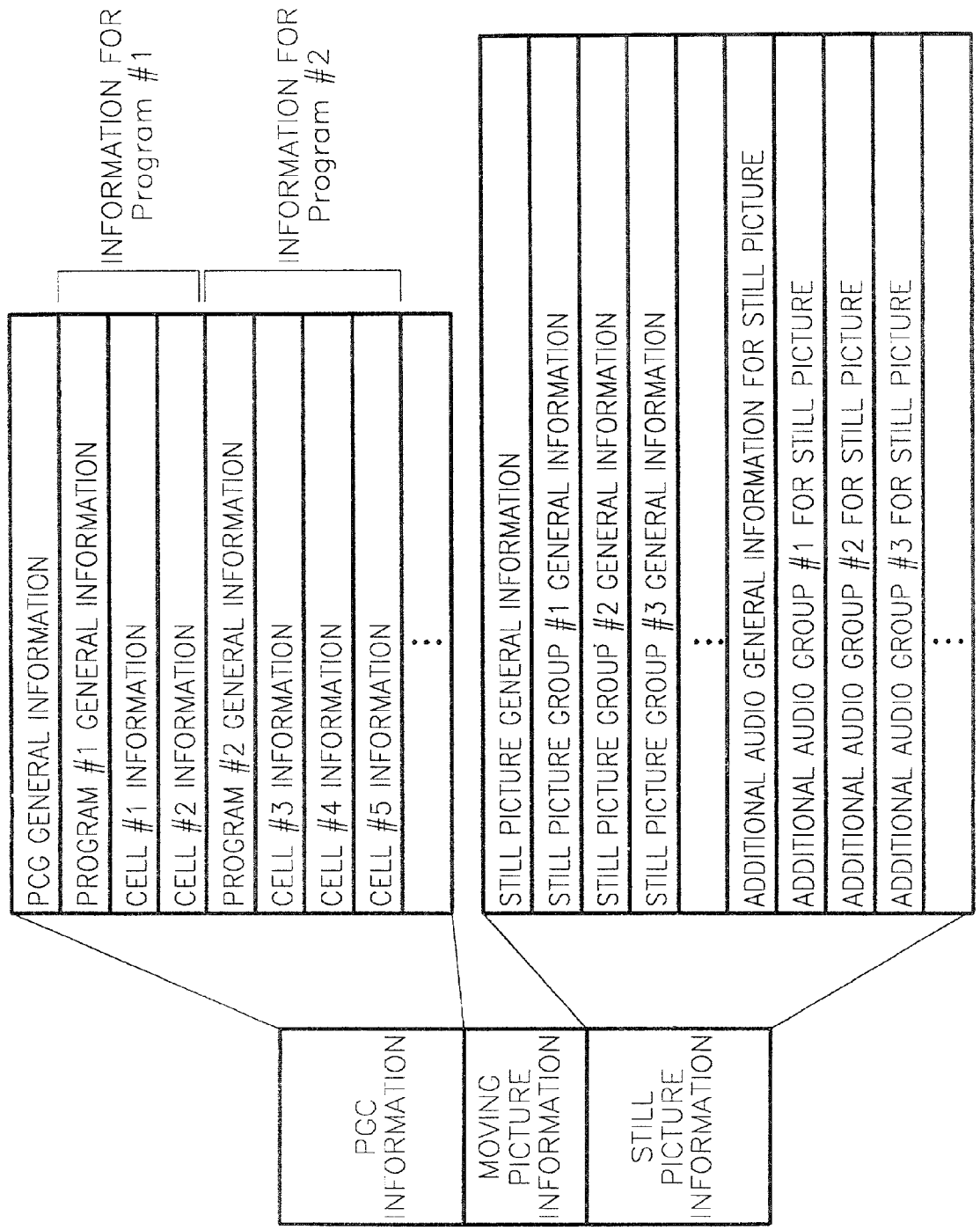
FIG. 4 shows an example of an overall information structure of a recording medium according to the present invention.

FIG. 4 shows an example of an overall information structure according to the present invention, in which information including PGC information, moving picture information and still picture information can be recorded in an information file or an information area.

Figure 5:
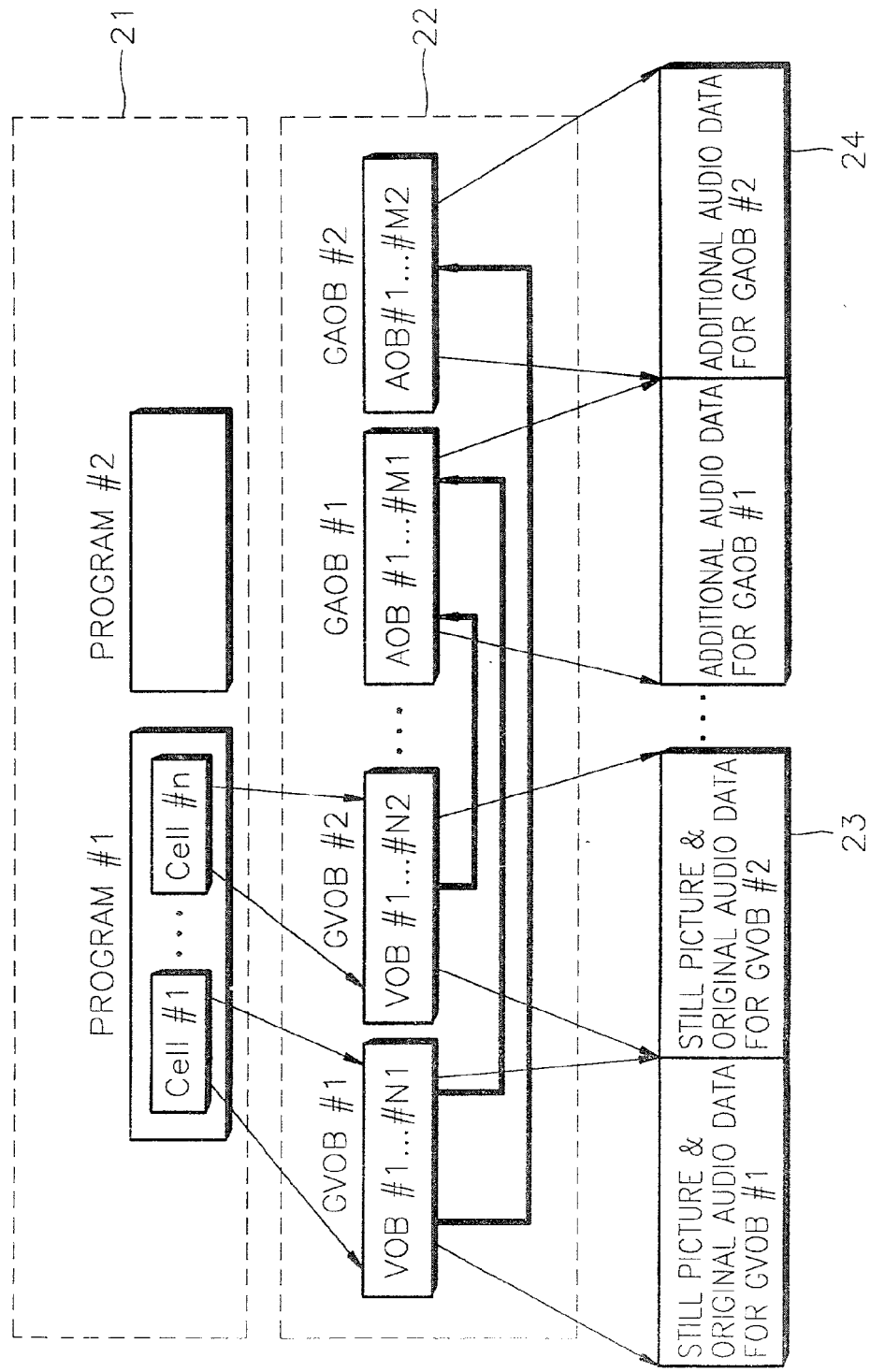
FIG. 5 shows the relationship between various kinds of information and still picture data in a still picture according to the present invention.

Here, PGC general information contains information such as the number of programs in a PGC. Program general information contains information such as the number of cells in a program. The cell information designates a VOB in the case of a moving picture, as shown in FIG. 1, and designates a still picture VOB group (to be abbreviated as "still picture group" for brevity) instead of a VOB, in the case of a still picture, as shown in FIG. 5. Since the moving picture information has already been described with reference to FIG. 1, a description thereof will be omitted herein and still picture information according to the present invention will now be described. Still picture general information contains information relating to the number of kinds of still picture group information, and additional audio general information for the still picture contains information relating to the number of kinds of additional audio group information.

FIG. 5 shows the connection structure of various kinds of information and still picture data in a still picture. In other words, in a still picture recorded in units of VOBs in a data file, a plurality of VOBs for still pictures are managed by a still picture group, and cell information contained in the PGC information 21 designates still picture group information (GVOB), rather than a single VOB information. Also, audio data may be recorded in addition to the still picture. The audio data is recorded consecutively after the still picture is recorded, thereby reducing the search time of a reproducing head during reproduction. The audio data recorded together with the still picture is called original audio data, which is contained in the still picture group. In the present invention, unless specifically defined, a still picture represents both one having only a video part and one having the original audio part and the video part. By managing the still picture by grouping the same in such a manner, the amount of cell information and still picture information can be reduced. For example, video coding attributes or original audio coding attributes in a still picture group are assimilated thus forming still picture group general information, and stored as common information. For the respective still pictures, the positions thereof in the still picture data file must be indicated. In the case when the still pictures are not separated into a plurality of groups, the start positions of the respective still pictures must be indicated. However, in the case when the still pictures are grouped, the start position at which the pertinent still picture group starts to be recorded in a file is stored in the still picture group general information and then only the sizes of the respective still pictures are recorded as the information for the respective still pictures. Since the amount of information indicative of the size of still picture data, i.e., the number of bytes, is generally less than that indicative of the position in a file, the overall amount of information can be reduced.

A user may add separate additional audio data to a desired still picture after recording the still picture and original audio data on a still picture file 23. At this time, only the additional audio data are collected and recorded in a separate area in the additional audio data file 24 or the still picture file 23, with the original audio data being retained. The additional audio data are also managed by grouping in the same manner as in the still picture data and the concept thereof is the same as that of the still picture data. In other words, a plurality of additional audio data having the same attributes, e.g., audio coding attributes, are grouped into an additional audio group (to be abbreviated as "GAOB") and then additional audio group general information is recorded as common information. For the respective additional audio data AOBs, only the size information is recorded. The additional audio group general information contains the start positions of audio data in the respective additional audio groups (GAOBs). The connection information for the additional audio data added to the specific still picture, which is indicated by thick arrows in FIG. 5, is present in the still picture group information GVOB #1, GVOB #2, . . . In other words, additional audio group identification information for designating additional audio data existing in the still picture group information and additional audio identification information in the pertinent additional audio group are contained in the still picture group information.

In order to locate a recording position of a specific still picture in the still picture group, the start position of the still picture group data contained in the still picture group general information is added to the size of the data preceding the still picture to be located. Likewise, in order to search the recording position of specific additional audio data, the start position of the additional audio group data contained in the additional audio group general information is added to the size of the data preceding the additional audio data to be located.

In the case of a still picture group, video parts and audio parts are consecutively recorded in a file or space. Thus, the video information and the audio information each containing the size thereof are also recorded in the bitstream order in which the video data and the original audio data are actually recorded. In the case of an additional audio group, there is only the additional audio data. Thus, only the additional audio information is recorded in the bitstream order in which the additional audio data is actually recorded.

Thus, as shown in FIG. 5, there is the still picture file 23 to which the original audio data may be added, the additional audio data file 24 added to the still picture and the information file containing the PGC information 21 and the still picture information 22 having the still picture group information (GVOB) and the additional audio group information (GAOB). However, the additional audio data may be recorded in a separate area of the still picture file 23, rather than in the additional audio data file 24. The still picture file 23 can be designated by a first region, the additional audio data file 24 can be designated by a second region, and the information file containing the PGC information 21 and the still picture information 22 can be designated by a third region which is a logic region.

Figure 6:
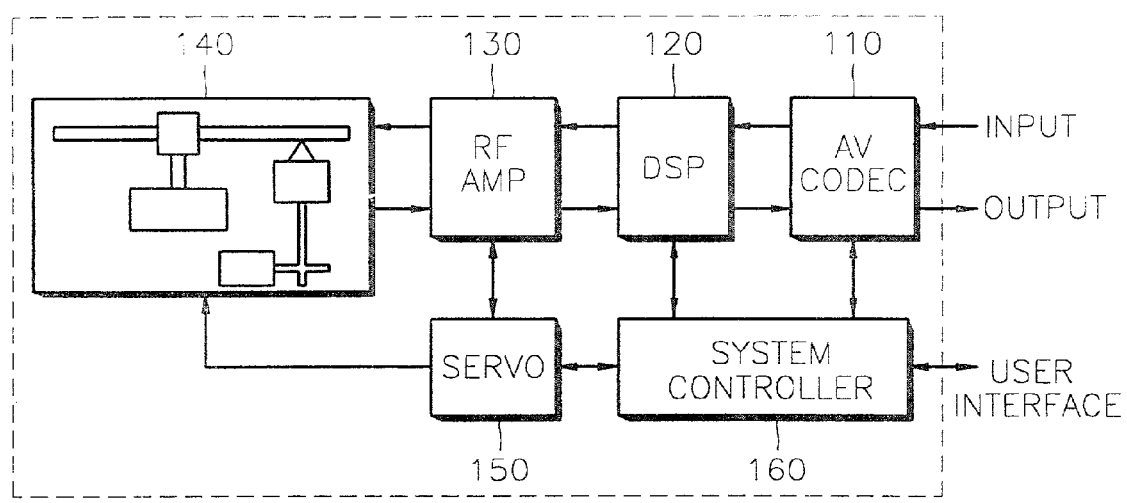
FIG. 6 is a block diagram of a recording/reproducing apparatus according to the present invention.

FIG. 6 is a block diagram of a recording/reproducing apparatus for implementing the present invention. The function of an apparatus for recording/reproducing A/V (audio/video) data using a recordable and rewriteable disk is largely divided into recording and reproduction.

During recording, an AV codec 110 compression-codes an externally applied A/V signal by a predetermined compression scheme and supplies size information for compressed data. A digital signal processor (DSP) 120 receives A/V data supplied from the AV codec 110, adds additional data for ECC (error correction code) processing thereto and performs modulation using a predetermined modulation scheme. A radio frequency amplifier (RF AMP) 130 converts electrical data supplied from the DSP 120 into an RF signal. A pickup 140 drives a disk and records the RF signal supplied from the RF AMP 130, incorporating an actuator for focusing and tracking. A servo 150 receives information necessary for servo control from a system controller 160 and stably performs a servo function. The system controller 160 controls the overall system through interfacing with a user to thus control the still picture to be recorded on the disk and record separate information for the recorded still picture. Still picture data are managed at a group level by constructing the still picture group information of the information for the respective still pictures, including size information of still picture data, size information of original audio data, playback time information of original audio data and the like, and the position information of the respective still pictures, in the recording order of recorded still pictures and audio data. When additional audio data is added to a still picture, the added additional audio data is recorded in a different file from or in the same file as that for the still picture but in a different area from that of the still picture. Additional audio data are managed at a group level by constructing additional audio group information of the information for recorded additional audio data, including size information of additional audio data, playback time information of additional audio data and the like, and position information of the respective additional audio groups. The information for the respective still pictures includes information indicative of the added additional audio data.

In the case when a user intends to delete an arbitrary still picture via a user interface, the system controller 160 does not to actually delete the still picture but sets deletion information in the still picture group information to a virtual delete state so that it is virtually deleted. In other words, since data is not reproduced during playback although it actually exists, it appears to the user that the data is deleted. In such a manner, if a specific still picture is virtually deleted and original audio data is recorded in sequence with the still picture, the original audio data is not reproduced either. Also, if additional audio data is added to the still picture, virtually deleted additional audio information in the additional audio group information is set to a virtual delete state so that although the additional audio data exists actually, it appears to the user that the additional audio data is deleted.

Cell information concerning the reproduction order is recorded as well as the above-described information. The cell information contains information indicative of the recorded still picture group so that the recorded still picture and audio data can be reproduced.

During playback, the pickup 140 picks up the optical signal from the disk having data stored therein and the data is extracted from the optical signal. The RF AMP 130 converts the optical signal (that is, RF signal) into electrical data, and extracts a servo signal for performing a servo function, and modulated data. The DSP 120 demodulates modulated data supplied from the RF AMP 130 corresponding to the modulation scheme used during modulation, performs an ECC process to correct errors and eliminates added data. The servo unit 150 receives information necessary for servo control from the RF AMP 130 and the system controller 160 and stably performs a servo function. The AV codec 110 decodes the compressed A/V data supplied from the DSP 120 to output an A/V signal. The system controller 160 controls the overall system for reproducing the user's desired data (still picture only, still picture+original audio data or still picture+additional audio data) using the cell information and still picture group information stored on the disk while performing user interfacing such as processing of the user's key inputs.

In other words, in order to reproduce a specific still picture and audio data, the still picture group information having the still picture to be reproduced is obtained from the cell information, information such as the size of the still picture data and the information for the data size and playback time of original audio data, if any, is obtained from the still picture group information, thereby reproducing only desired data. Also, if additional audio data is added to the still picture, desired additional audio data is reproduced using information for the data size or playback time of the additional audio data from the additional audio group information pointed to by the still picture group information.

Also, if virtually deleted still picture information is read from the still picture group information, the corresponding still picture and original audio data are not reproduced so that although the data actually exists, it seems to the user that it does not exist. Likewise, if the added additional audio data is virtually deleted, it is not reproduced.

Here, the A/V codec 110, the DSP 120, the RF AMP 130 and the pickup 140 operating during recording can be referred to as a recording processor. Also, the pickup 140, the RF AMP 130, the DSP 120 and the AN codec 110 operating during playback can be referred to a reproduction processor.

Figure 7:
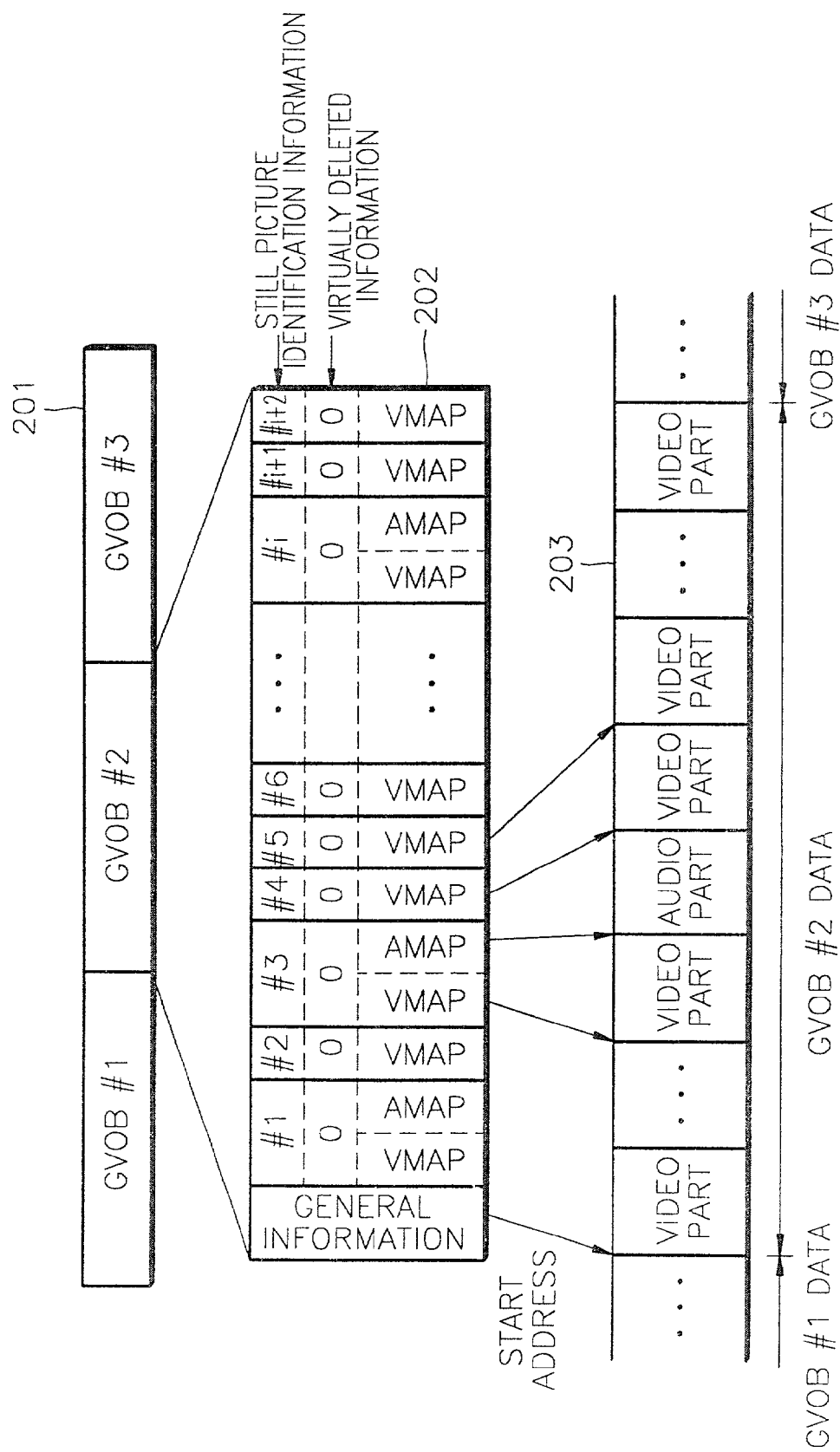
FIG. 7 shows the relationship between still picture data and still picture group information according to the present invention.

FIG. 7 shows the relationship between still picture data and still picture group information, in which the information for a plurality of still pictures (e.g., 64 maximally) having the same attributes is recorded in the respective still picture group (GVOB) information 201. The number of the still pictures forming each still picture group is determined such that it is within the limit of the maximum number of still pictures. Each still picture group information 202 includes still picture group general information and information for the respective still pictures and is information for still picture data 203 composed of video parts and video or audio parts in a sequence of bitstreams recorded. The still picture group general information has the start address of the corresponding still picture group.

Also, as information for the respective still pictures, still picture information having original audio data exists in the form of map information including video part information for video parts and audio part information for audio parts. Here, a video map and an audio map for a still picture have the same identification information. If the still picture information is includes only a video part, it exists in the form of a map having only the video part information. In the still picture group information 202, virtual deletion information for virtually deleting both a still picture and original audio data added thereto is present. Here, still picture data is recorded in a VOB.

Figure 8:
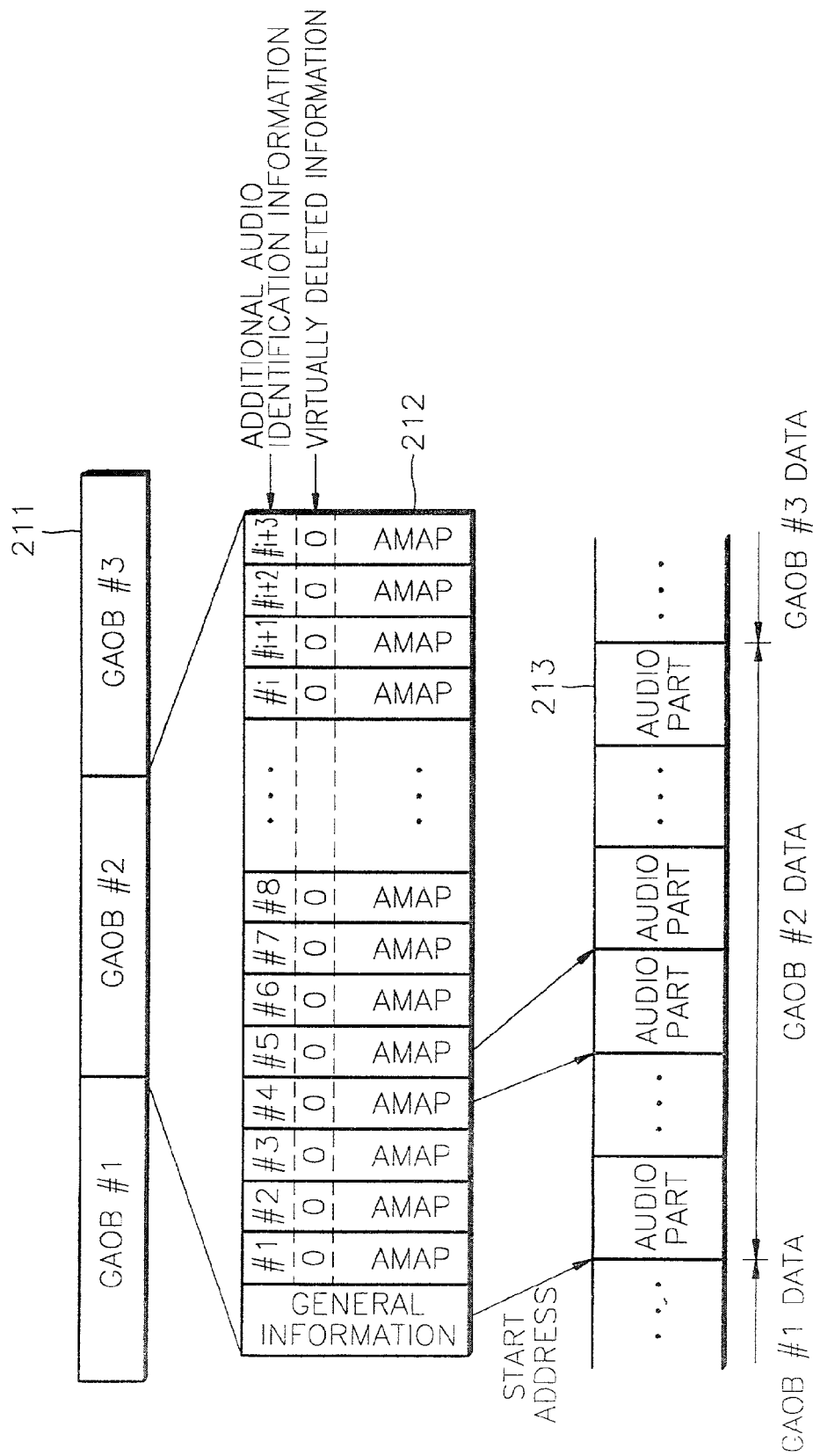
FIG. 8 shows the relationship between additional audio data added to still picture data and additional audio group information according to the present information.

FIG. 8 shows the relationship between additional audio data added to a still picture and additional audio group information according to the present information, in which additional audio group (GAOB) information 211 includes information for additional audio data recorded in units of a plurality of additional audio groups. Additional audio group information 212 has additional audio group general information containing the start address of the corresponding additional audio group and audio maps (AMAPs) following the sequence of additional audio data. The information for additional audio data 213 including an additional audio part of a still picture is recorded in each additional audio map, inclusive of size information of the additional audio data thereof. Also, the additional audio group information 212 includes virtual deletion information for virtually deleting the respective audio parts.

Figure 9:
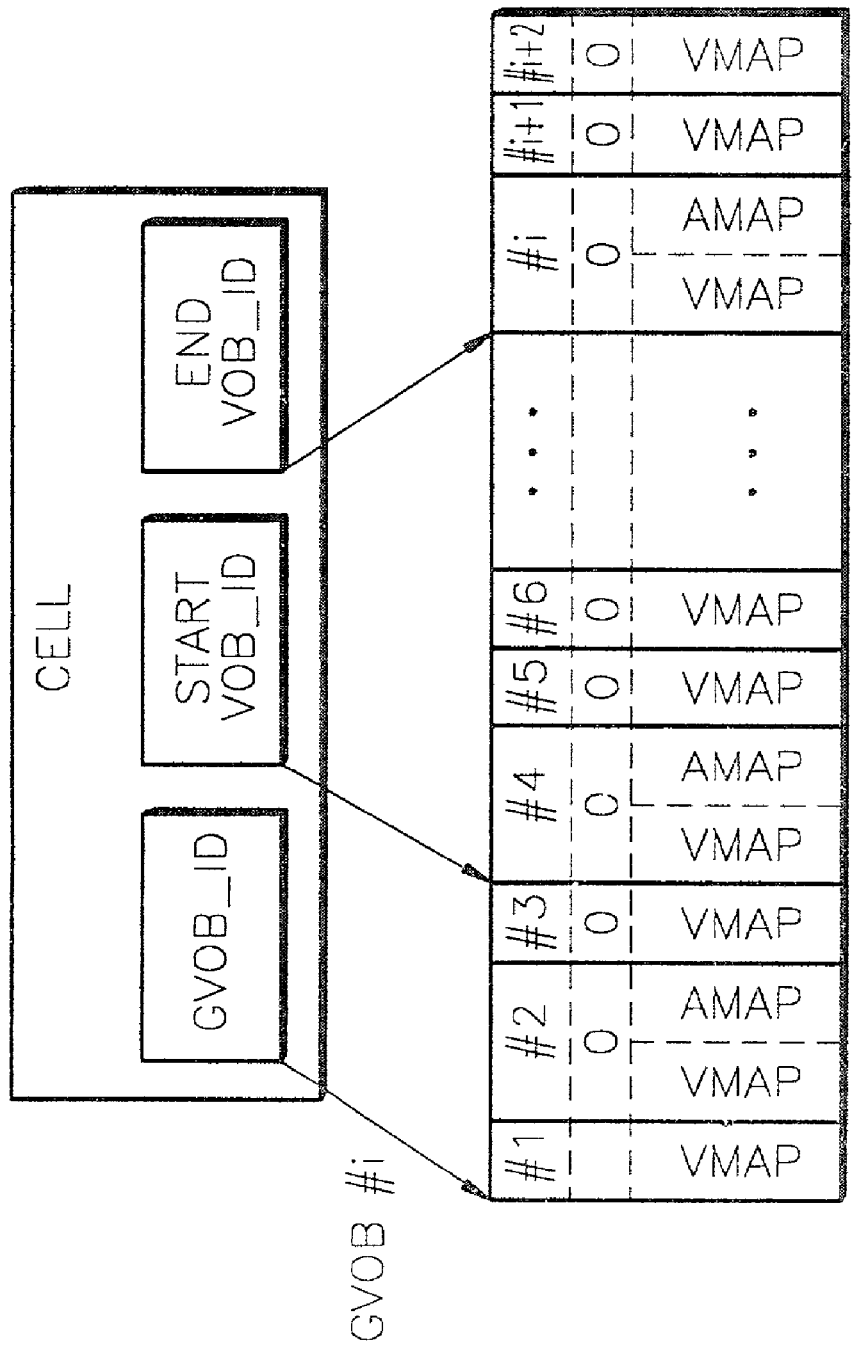
FIG. 9 shows the relationship between cell information and still picture group information.

FIG. 9 shows the relationship between cell information (which can also be referred to as playback information) and still picture group information, in which a cell is a logical unit in relation to indication of a reproduction order. The cell information includes still picture group identification information (GVOB_ID), still picture reproduction start identification information (START VOB_ID) of the corresponding still picture group and still picture reproduction ending identification information (END VOB_ID). The cell information may correspond to all the still picture groups or may correspond to some of the still picture groups which are intended to be reproduced.

The additional audio data are stored in a separate area from the still picture data, that is, in a different file or in a different area of the same file from or as that of the still picture data.

For example, in the case when the additional audio data is stored in a separate file from the still picture data, as shown in FIG. 7, GVOB #1, #2 and #3 having still picture data constitute a file. Also, as shown in FIG. 8, GAOB #1, #2 and #3 having additional audio data constitute a file. Thus, in the case of recording/reproducing actual still picture or additional audio data, the still picture or additional audio data is accessed using the information of each file.

Alternatively, in the case when the additional audio data and the still picture data are stored in one and the same file, GVOB #1, #2 and #3 and GAOB #1, #2 and #3 shown in FIGS. 7 and 8 constitute a file. In constituting the file in such a manner, the respective GVOBs and GAOBs may be mixed in the recording order, for example, in the order of GVOB #1, GVOB #2, GAOB #1, GVOB #3, GAOB #2 and GAOB #3. Otherwise, the GVOBs and GAOBs are coupled and arranged in each batch to constitute a file.

Figure 10:
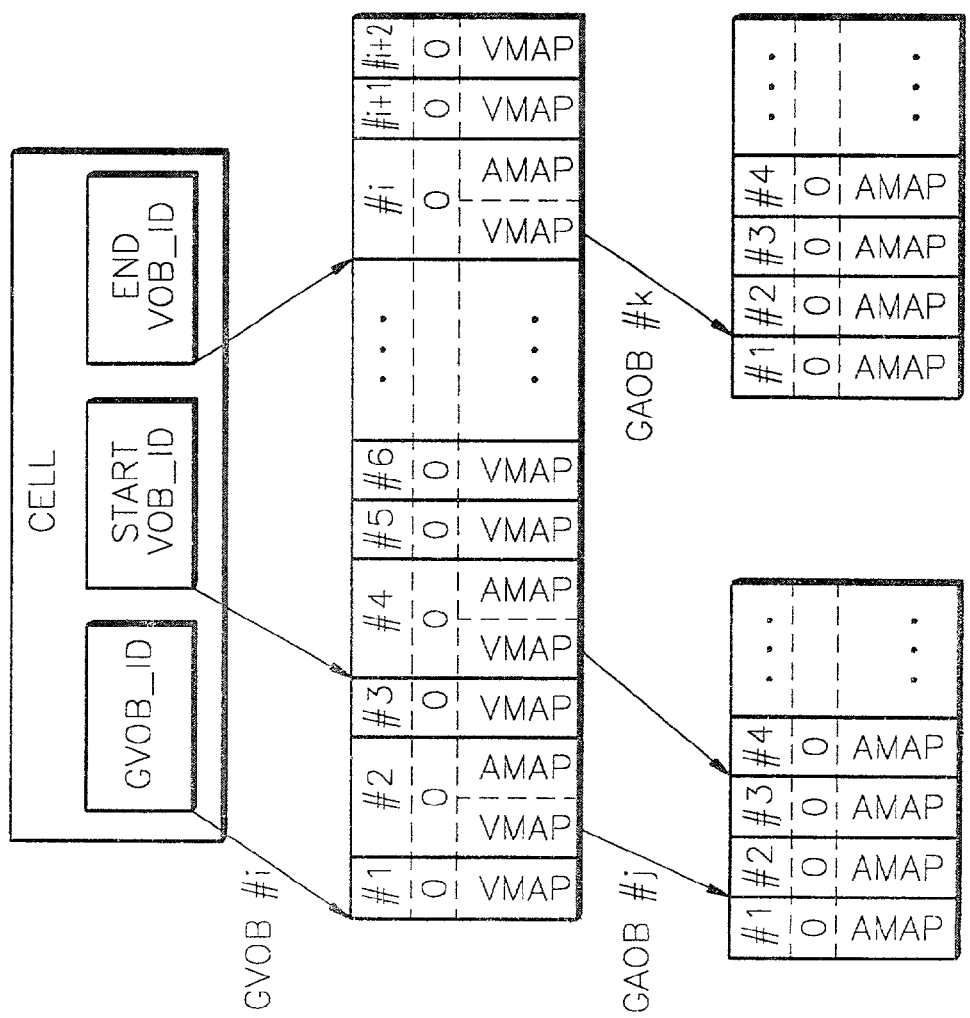
FIG. 10 shows the relationship among cell information, still picture group information and additional audio group information.

FIG. 10 shows the relationship among cell information, still picture group information and additional audio group information, for designating desired additional audio data in the additional audio group recorded in a separate area as well as original audio data as the audio data added to a still picture. The cell information includes still picture group identification information (GVOB_ID), still picture reproduction start identification information (START VOB_ID) in the corresponding still picture group and still picture reproduction ending identification information (END VOB_ID). Video part information in the information for still picture group GVOB #1 may have information for designating additional audio data added to a still picture, that is, additional audio group identification information and additional audio identification information in the corresponding additional audio group. For example, additional audio group identification information GAOB #j and identification information #2 indicating that the additional audio data is the second audio map in the GAOB #j exist in the video part information for a still picture #2 of the still picture group GVOB #i.

In the present invention, when a plurality of still pictures are recorded in a file and still pictures are deleted and fragmented in several parts by a user's request, to avoid an abrupt increase in file extent information, a plurality of still pictures are grouped and managed at a still picture group level, and each still picture has virtual deletion information. Thus, even if a user deletes a still picture, the still picture is not actually deleted from the file but appears to be deleted since they are not reproduced according to the virtual deletion information. In some cases, the user deletes still pictures for the purpose of securing empty space (free area) for recording new data thereon in addition to avoidance of reproduction of data. In this case, since the data is not actually deleted, the empty space cannot be secured just by using the virtual deletion information. If all of the still pictures in the still picture group information are virtually deleted, they are actually deleted from the file in units of still picture groups, thereby securing a free area. In other words, since a still picture group is formed by a plurality of still pictures, a considerable amount of free space is produced by deleting the same.

Figure 11:
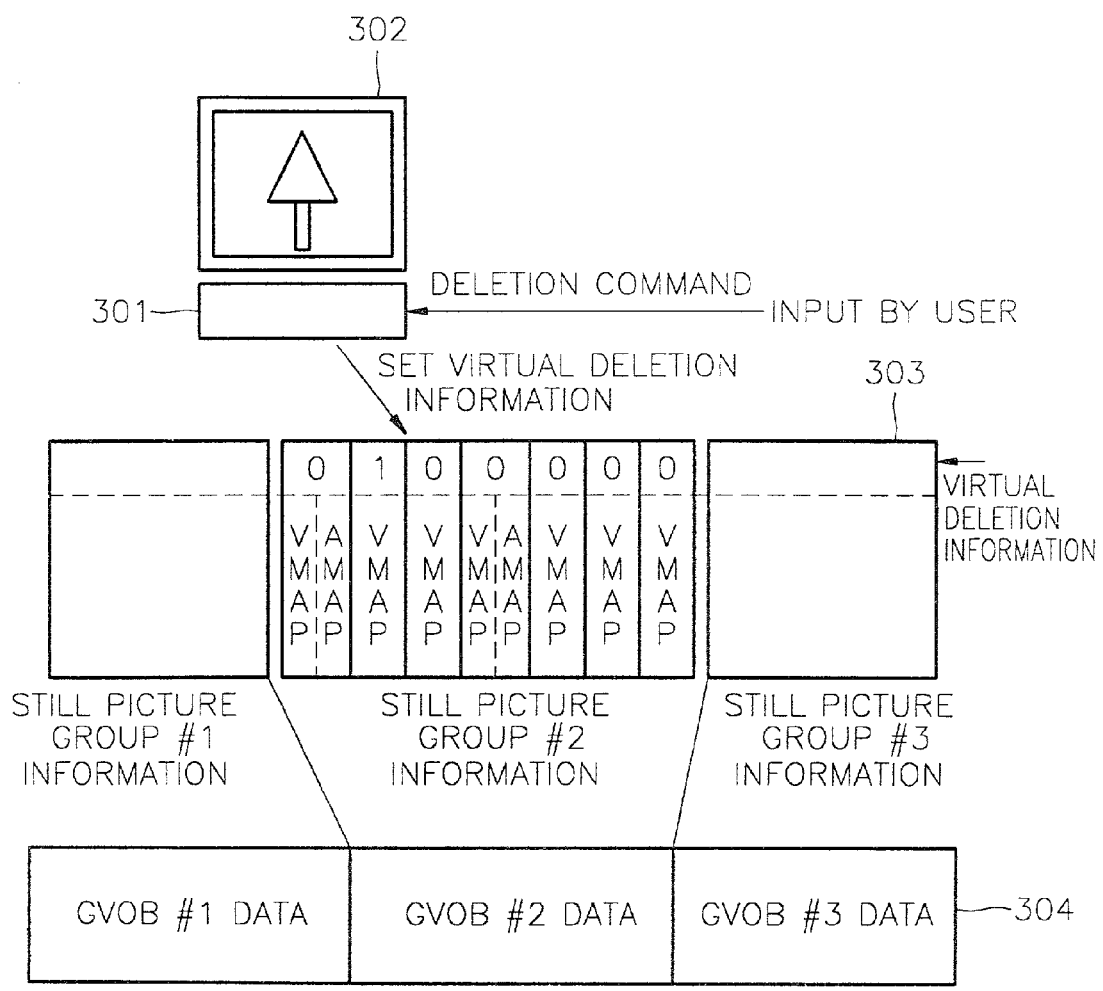
FIG. 11 illustrates a virtually deleted still picture file and still picture group information in accordance with a still picture deletion command.

As shown in FIG. 11, if a still picture deletion command is input by a user through an input device 301 such as a key pad mounted on a still picture output device 302 or a remote controller, virtual deletion information out of the information for the corresponding still picture in the still picture group information is set to "1" indicative of a virtual delete state, without change in an actual still picture file 304. Since there is no change in the actual still picture file 304, the file area information for the still picture file is not increased. The virtual deletion information is commonly applied to the original audio data added to the still picture. In other words, if a still picture is virtually deleted, the original audio data is also considered to have been deleted. Here, if the virtual deletion information set to "1" is cleared to "0", the still picture can be restored.

Figure 12:
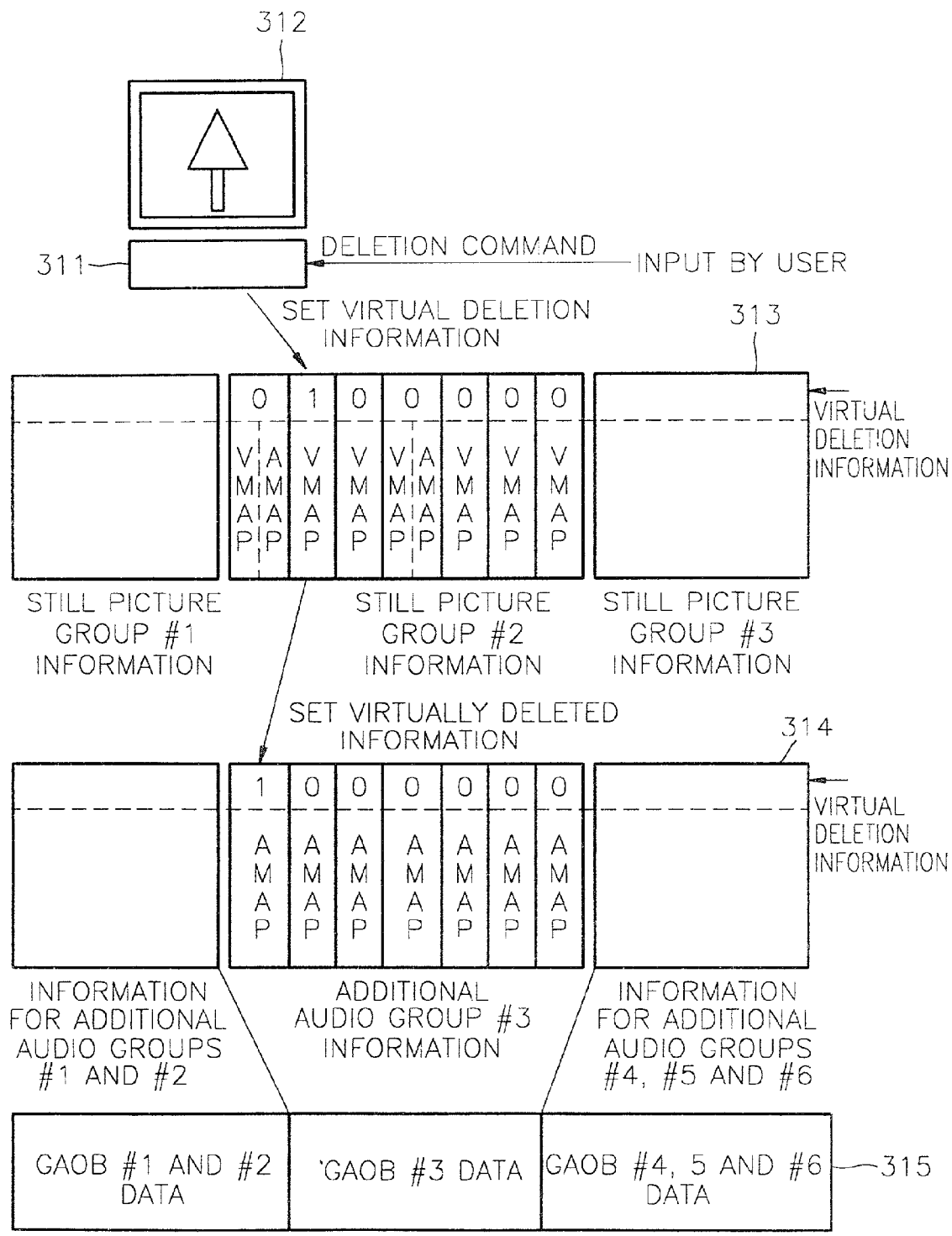
FIG. 12 illustrates a virtually deleted additional audio data file and additional audio group information in accordance with a still picture deletion command.

However, if additional audio data is added to a still picture, instead of the virtual deletion information (which can be referred to as first virtual deletion information) for a still picture, as shown in FIG. 12, the virtual deletion information in additional audio group information (which can be referred to as second virtual deletion information) can be used. If a still picture deletion command is input by a user through an input device 311, virtual deletion information for the corresponding still picture in the still picture group information is set to "1" indicative of a virtual delete state and virtual deletion information for additional audio data in the additional audio group information 314 for the still picture is also set to "1". Thus, the corresponding additional audio data in an additional audio file 315, is not actually deleted either. Here, if the virtual deletion information set to "1" is cleared to "0", the additional audio data can be restored.

Actual deletion of a file occurring in a still picture group or additional audio group will be described with reference to FIGS. 13 and 14. In other words, when all the information in a group is virtually deleted, the group can be actually deleted from a file.

Figure 13:
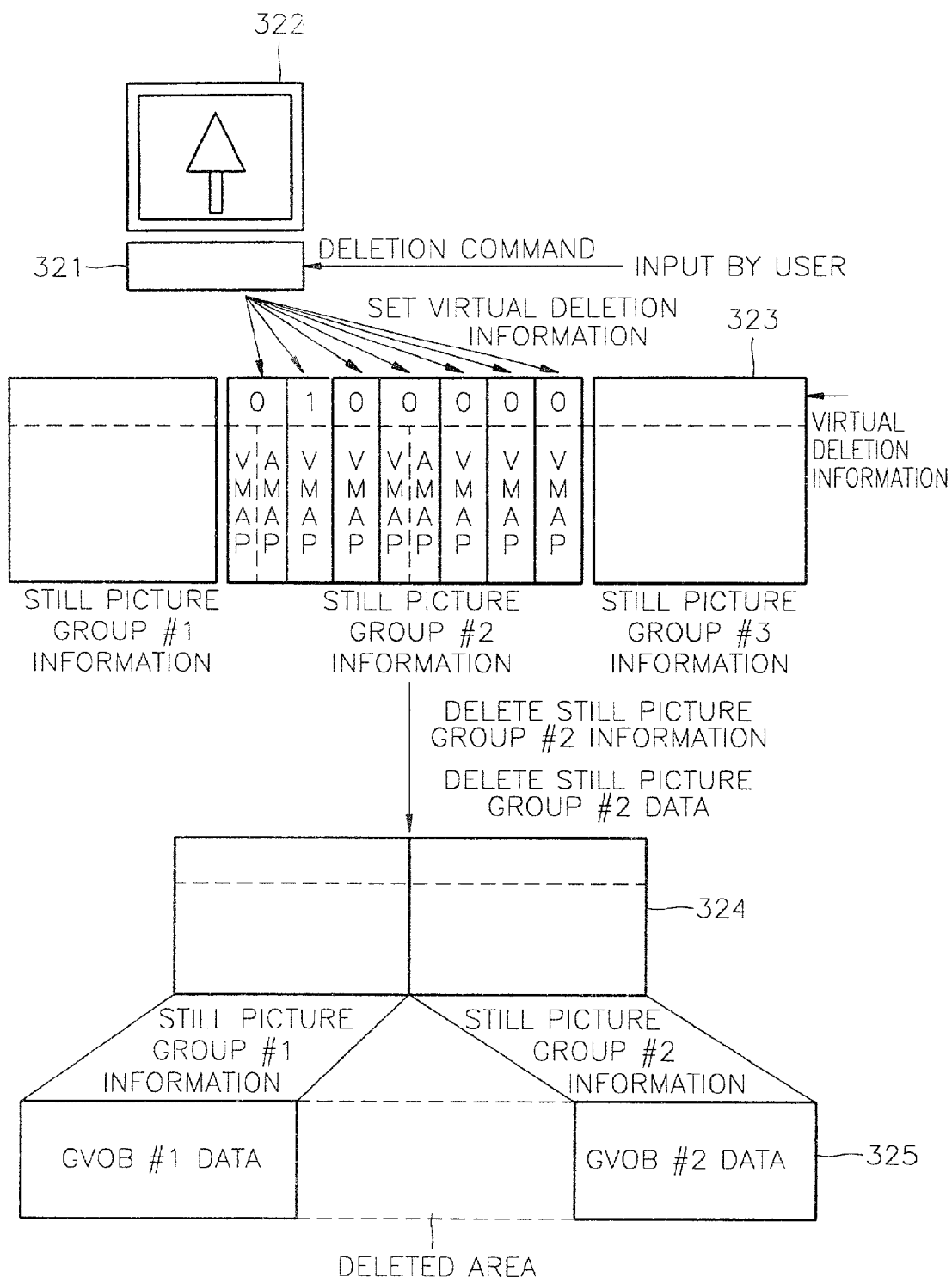
FIG. 13 illustrates actual deletion of a still picture file and still picture group information in accordance with a deletion command for all still pictures in a still picture group.
Figure 14:
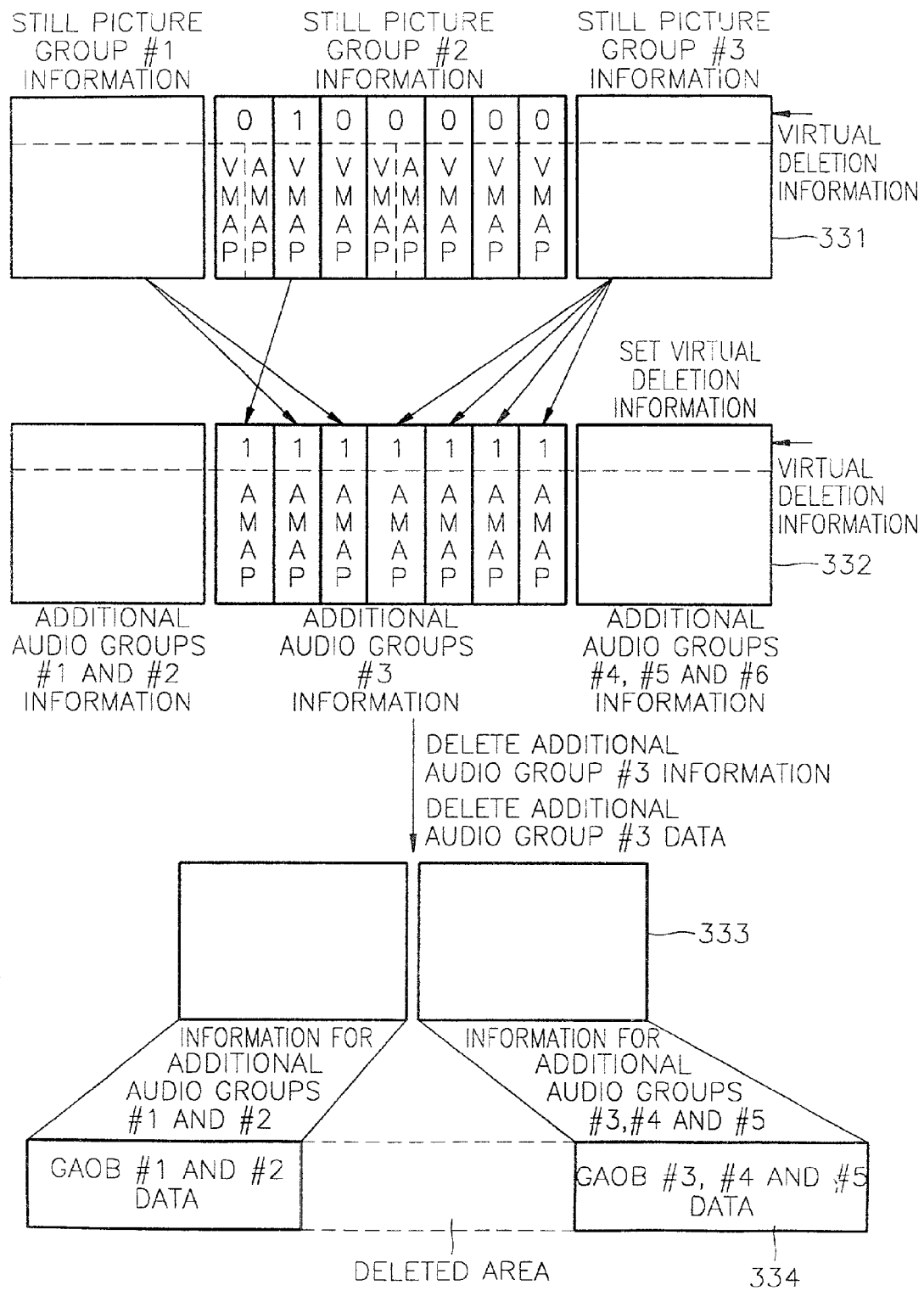
FIG. 14 illustrates actual deletion of an additional audio data file and additional audio group information in accordance with a deletion command for all still pictures in an additional audio group.

As shown in FIG. 13, if a still picture deletion command, for virtually deleting all still pictures in the information for a still picture group #2, is input by a user through an input device 321 and virtual deletion information in the information for a still picture group #2 in the still picture group information 323 is set to "1" indicative of a virtual delete state, the information for a still picture group #2 in the still picture group information 323 is deleted so that updated still picture group information 324 is created and data for GVOB #2 in a still picture file 325 is actually deleted to be allocated as a free area. Therefore, even if a plurality of still pictures are deleted, a discontinuous section in a still picture file is determined by deletion of the entire group, so that the file area information is increased by a small amount. In FIG. 13, identification numbers for still picture groups are sequentially given again. However, if the identification numbers are expressly stored in the still picture group information, they can be retained as they are.

Similarly, data of an additional audio group file can be actually deleted. As shown in FIG. 14, virtual deletion information for the corresponding still pictures in still picture group information 331 is set to "1" indicative of a virtual delete state by a still picture deletion command, and the virtual deletion information of the entire additional audio information of the information for a still picture group #3 in additional audio group information 332 corresponding to the still pictures set to a virtual delete state, is set to a virtual delete state "1".

The information for the additional audio group #3 in the additional audio group information 332 is deleted and updated additional audio group information 333 is created. Data for GAOB #3 in an actual audio file 334 is deleted to be allocated as a free area. In this case, the file extent information is increased by a very small amount. In FIG. 14, identification numbers for additional audio groups are sequentially given again. However, if the identification numbers are expressly stored in the additional audio group information, they can be retained as they are.

FIG. 15 illustrates the structure of still picture group information according to the present invention, which includes still picture group general information and a still picture map table, and may further include attribute information for a still picture such as picture sizes or video encoding modes.

FIG. 16 is a table showing an example of the detailed contents of still picture group general information shown in FIG. 15, which includes GVOB_ID representing information for identifying a still picture group in a still picture file, GVOB_S_ADR representing the start address of first still picture data in the corresponding still picture group in the still picture file, GVOB_Ns representing the number of still pictures in the still picture group, GVOB_Ds representing the number of virtually deleted still pictures in the corresponding VOB group, and so on. If GVOB_Ds and GVOB_Ns are equal to each other, the VOB group can be deleted from a file. If GVOB_Ds is not stored expressly, it is checked whether all still pictures in the corresponding still picture group are in a virtually deleted state to then be actually deletable. Also, the identification information GVOB_ID can be expressly recorded as a unique one for each still picture group in a still picture file or can be suggestively indicated in the order of still picture groups, that is, #1, #2, . . .

FIG. 17 illustrates the structure of the still picture map table shown in FIG. 15. There are two types of maps; one is video maps VMAPs for video parts and the other is audio maps AMAPs for original audio parts added to the still pictures. The order of maps is the same as that of data of recorded bitstreams in a still picture file as shown in FIG. 7. Thus, in the case when a still picture has only a video part, there is only a video map. In the case when a still picture has original audio data in addition to the video part, both a video map and an audio map are recorded and are practically considered as one map using the same identification information.

Figures 18, 19, 20:
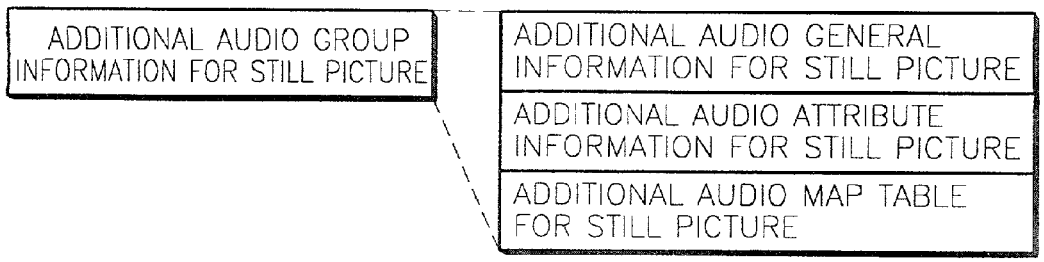
FIG. 18 is a table showing an example of the detailed contents of a video map in the map table shown in FIG. 17.
FIG. 19 is a table showing an example of the detailed contents of an original audio map connected to the video map shown in FIG. 18.
FIG. 20 illustrates the structure of additional audio group information for a still picture according to the present invention.

FIG. 18 is a table showing an example of the detailed contents of a video map in the map table shown in FIG. 17, containing MAP_TY indicating the type of a corresponding map and represented by a binary "0" in the case of a video map for a video part, VOB_ID indicating identification information for the video part and ranging from 1 to 64 in this embodiment. Also, VOB_ID can be expressly indicated or suggestively indicated in the recording order, that is, #1, #2, #3, . . .

Also, the video map contains V_DELETE which is a binary value indicating deletion or non-deletion of a VOB, that is, indicating that a VOB is not deleted if the value thereof is "0" and that the VOB is virtually deleted if the value thereof is "1" V_PART_SZ indicating the size of a video part, GAOB_ID which is identification information of an additional audio group, the value of which exists if a still picture has additional audio data, and the value of which is "0" if a still picture does not have additional audio data, and AOB_ID which is identification information of additional audio data in an additional audio group if a still picture has additional audio data, and the value of which is "0" if the still picture does not have the additional audio data.

Here, V_DELETE represented by a binary value "1" indicates that a still picture is virtually deleted. Thus, if the still picture has original audio data, the original audio data is also considered to have been virtually deleted. This is because original audio data solely existing after the still picture is deleted as being meaningless. Also, VOB_ID and V_PART_SZ can be referred to as still picture position information, and GAOB_ID and AOB_ID can be referred to as additional audio connectivity information.

FIG. 19 is a table showing an example of the detailed contents of an original audio map, containing MAP_TY indicating the type of a corresponding map and represented by a binary value "1" in the case of an audio map for an audio part, A_PBTM indicating the playback time of an audio part and A_PART_SZ indicating the size of the audio part.

FIG. 20 illustrates the structure of additional audio group information for a still picture according to the present invention, containing additional audio general information and an additional audio map table for the still picture. Also, additional audio attribute information for the still picture may be further included.

Figures 21, 22, 23:
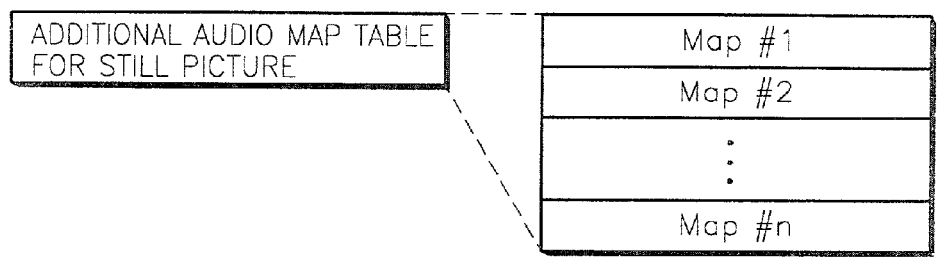
FIG. 21 is a table showing an example of the detailed contents of additional audio group general information for the still picture shown in FIG. 20.
FIG. 22 illustrates the structure of an additional audio map table for the still picture shown in FIG. 20.
FIG. 23 is a table showing an example of the detailed contents of the additional audio map table for the still picture shown in FIG. 22.

FIG. 21 is a table showing an example of the detailed contents of additional audio general information for a still picture, shown in FIG. 20, containing GAOB_ID indicating identification information for an additional audio group in an additional audio file, GAOB_S_ADR indicating the start address of the first additional audio data in the corresponding additional audio group in the additional audio file, and GAOB_Ns indicating the number of additional audio parts contained in the additional audio groups. GAOB_ID can be expressly indicated or suggestively indicated in the recording order.

FIG. 22 illustrates the structure of an additional audio map table consisting of n additional audio maps for additional audio parts shown in FIG. 20.

FIG. 23 is a table showing an example of the detailed contents of the additional audio map table for the still picture shown in FIG. 22, containing AOB_ID indicating identification information for a specific audio part in an additional audio group and ranging from 1 to 64 in this embodiment, A_DELETE indicating whether an additional audio part is virtually deleted or not, A_PBTM indicating the playback time of additional audio data and A_PART_SZ indicating the size of additional audio data such as the number of sectors. Here, AOB_ID can be expressly indicated or suggestively indicated in the recording order, that is, #1, #2, #3, . . .

FIG. 24 is a table showing an example of the detailed contents of cell information for a still picture, shown in FIGS. 9 and 10, containing S_GVOB_ID indicating identification information for a still picture group, S_VOB_ID indicating identification information for a still picture in which reproduction starts, and E_VOB_ID indicating identification information for a still picture in which reproduction ends.

Figure 25A:
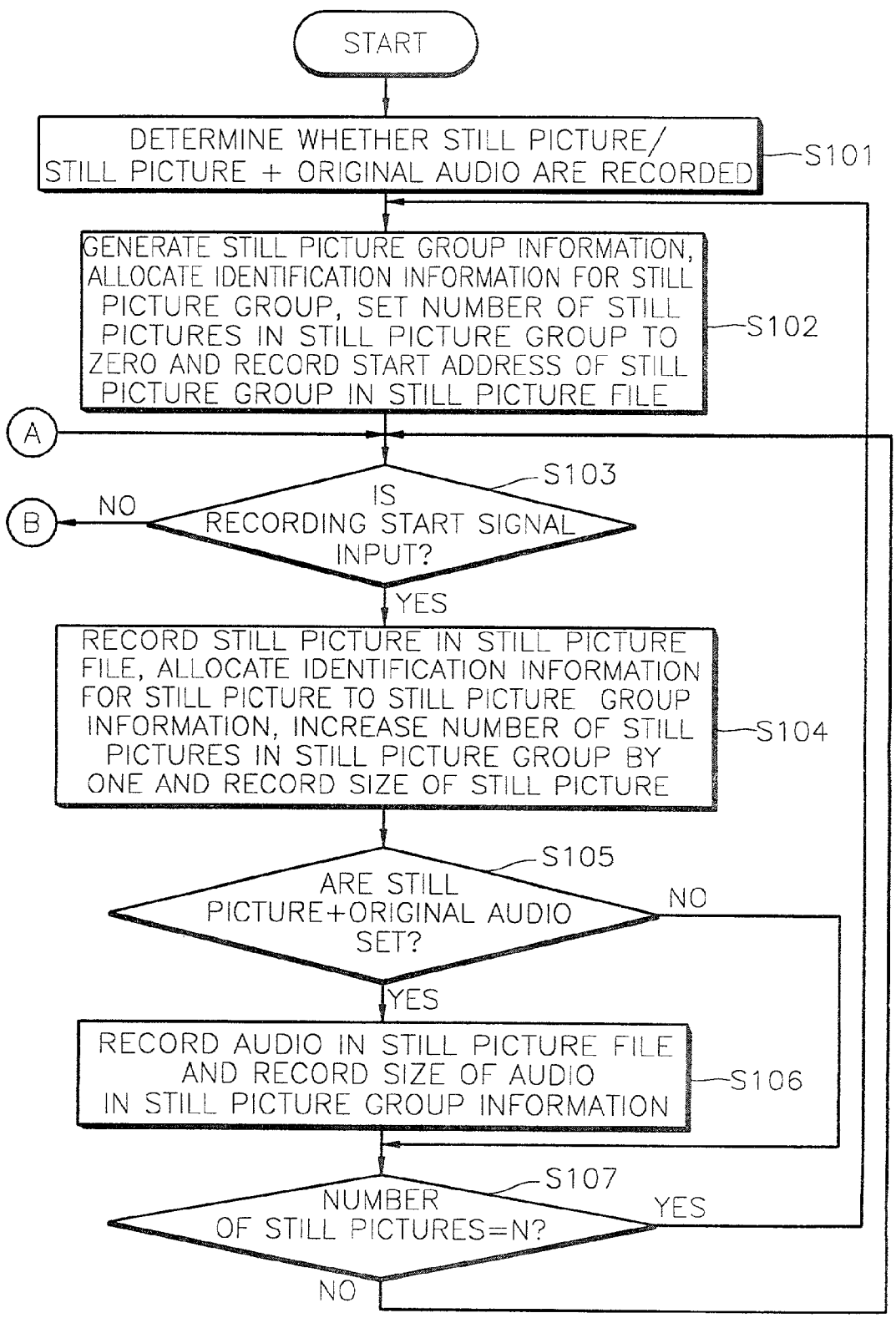
FIGS. 25A and 25B illustrate a flow chart showing a method for recording a still picture according to a first embodiment of a present invention.
Figure 25B:
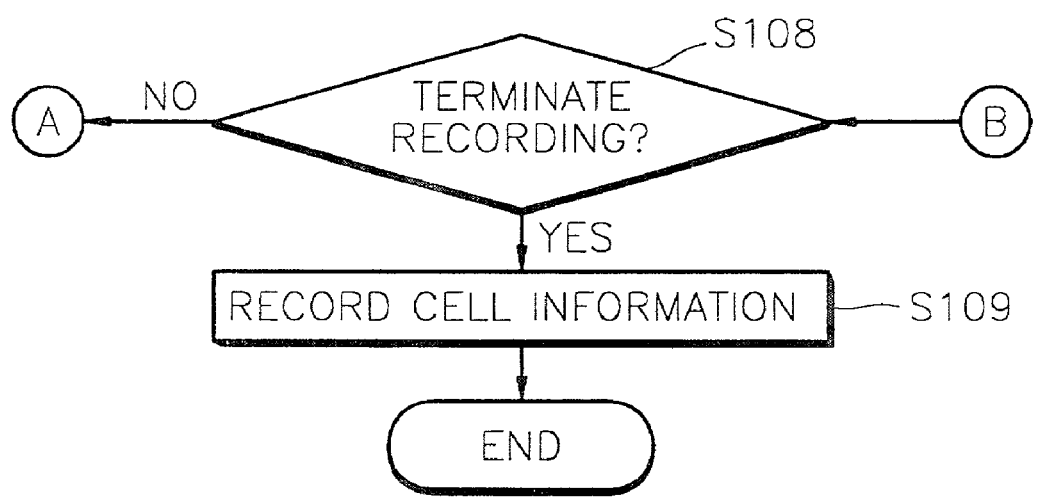

FIGS. 25A and 25B illustrate a flow chart showing a method for recording a still picture according to a first embodiment of the present invention, that is, a method for recording a still picture and original audio data. First, it is determined whether a still picture or both a still picture and original audio data are recorded (step S101). Still picture group information is generated, identification for a still picture group is allocated, the number of still pictures in the still picture group is set to "0" and the start address of the still picture group in a still picture file is recorded (step S102). It is then determined whether a recording start signal of a still picture is input by a user or not (step S103). If the recording start signal is input, the still picture is recorded in the still picture file, identification information for the still picture is allocated to the still picture group information, the number of still pictures in the still picture group is increased by one and the size information of the still pictures is recorded in the video map (step S104).

It is determined whether or not a mode set by a user is for recording both a still picture and original audio data (step S105). If yes, the audio data for the still picture is recorded following the corresponding still picture on the still picture file and the audio size information is recorded in an audio map in the still picture group information (step S106).

It is determined whether the number of still pictures recorded is the maximum number possible to constitute the information for a still picture group (e.g., 64 maximally) (step S107). If the still picture group information is completed, the procedure returns to step S102 to generate another still picture group information. Otherwise, the procedure proceeds to step S103 to determine whether a recording start signal of a still picture is input by a user or not.

If the mode set by a user is for recording only a still picture in step S105, step S106 is skipped and the procedure proceeds to step 107 to record the next still picture. If the recording start signal of a still picture is not input by a user in step S103, it is determined whether or not to terminate recording (step S108). If it is determined to terminate recording, cell information is recorded and the procedure ends (step S109). Here, the cell information is created for every still picture group so as for all still pictures to be reproduced.

Figure 26:
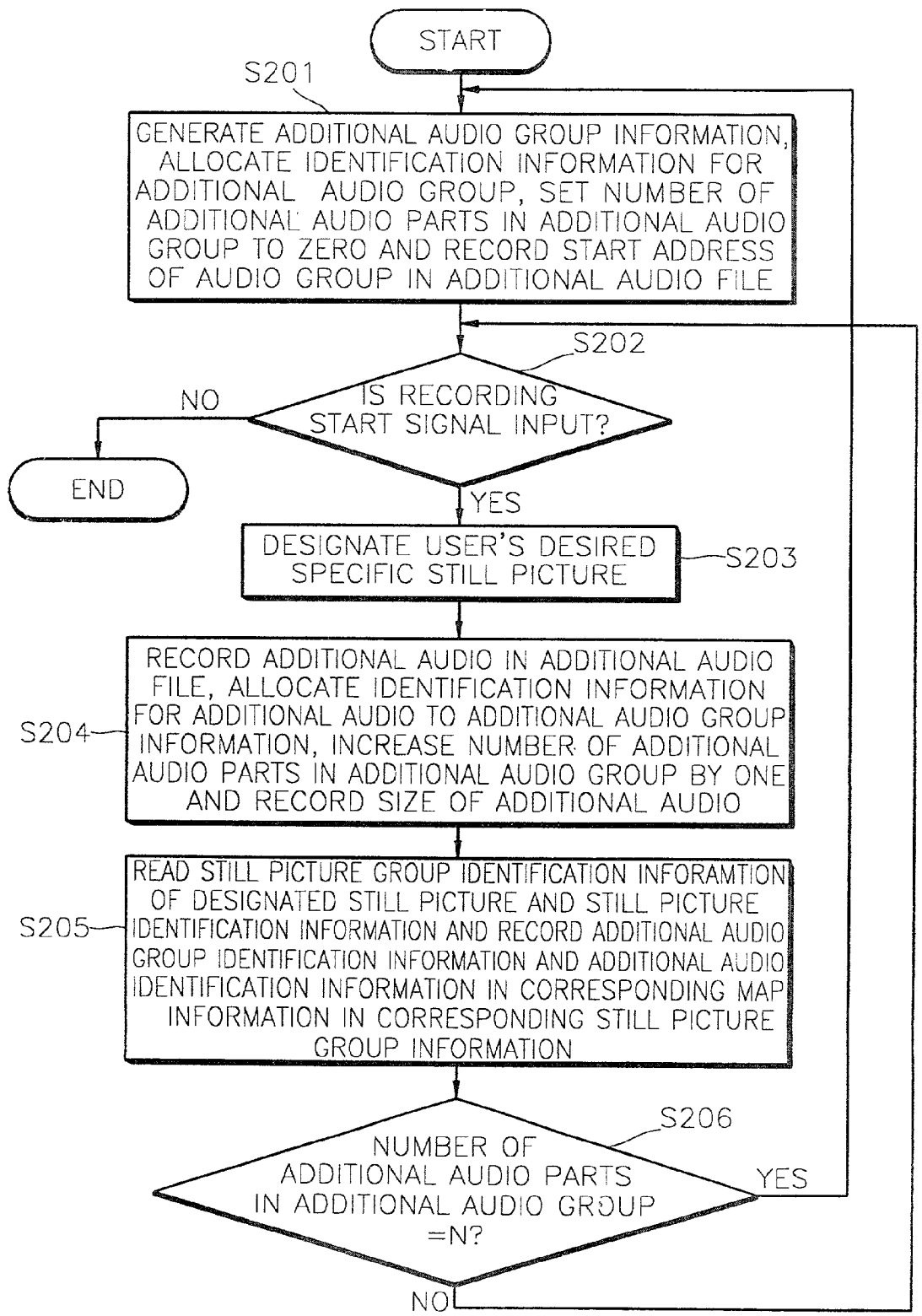
FIG. 26 is a flow chart showing a method for recording additional audio data after recording a still picture according to the first embodiment of the present invention.

FIG. 26 is a flow chart showing a method for recording additional audio data after recording a still picture according to the first embodiment of the present invention. First, additional audio group information is generated, identification information for an additional audio group is allocated, the number of additional audio parts in the additional audio group is set to "0" and the start address of the audio group is recorded in an additional audio file (step S201).

It is then determined whether the recording start signal of additional audio data is input by a user or not (step S202). If the recording start signal is input, a specific still picture to which the user desires to add additional audio data is designated (step S203). The additional audio data is recorded in an additional audio file, identification information for additional audio data in the audio map of the additional audio group information is allocated, the number of additional audio parts in the additional audio group is increased by one, and the size information of the additional audio data in the audio map is recorded (step S204). Although it has been described herein that the additional audio data is recorded in a different file from that of the still picture, the additional audio data can be recorded in a separate area of the same file as that of the still picture.

Identification information for the still picture group of a predetermined still picture and identification information for the still picture are read and the information for the still picture, that is, identification information for an additional audio group for additional audio parts and identification information for additional audio data, are recorded in the video map for the predetermined still picture (step S205).

It is then determined whether the number of additional audio parts in an additional audio group reaches N, that is, a maximum number to constitute a group (step S206). If yes, the procedure goes to step S201 to generate another additional audio group information. Otherwise, it is determined whether the recording start signal of additional audio data is input by a user (step S202). If a recording start signal of additional audio data is not input by a user in step 202, the procedure is terminated.

Here, the step of designating a specific still picture (step S203) may precede the step of determining whether or not a recording start signal of additional audio data is input by a user (step S202).

Figure 27:
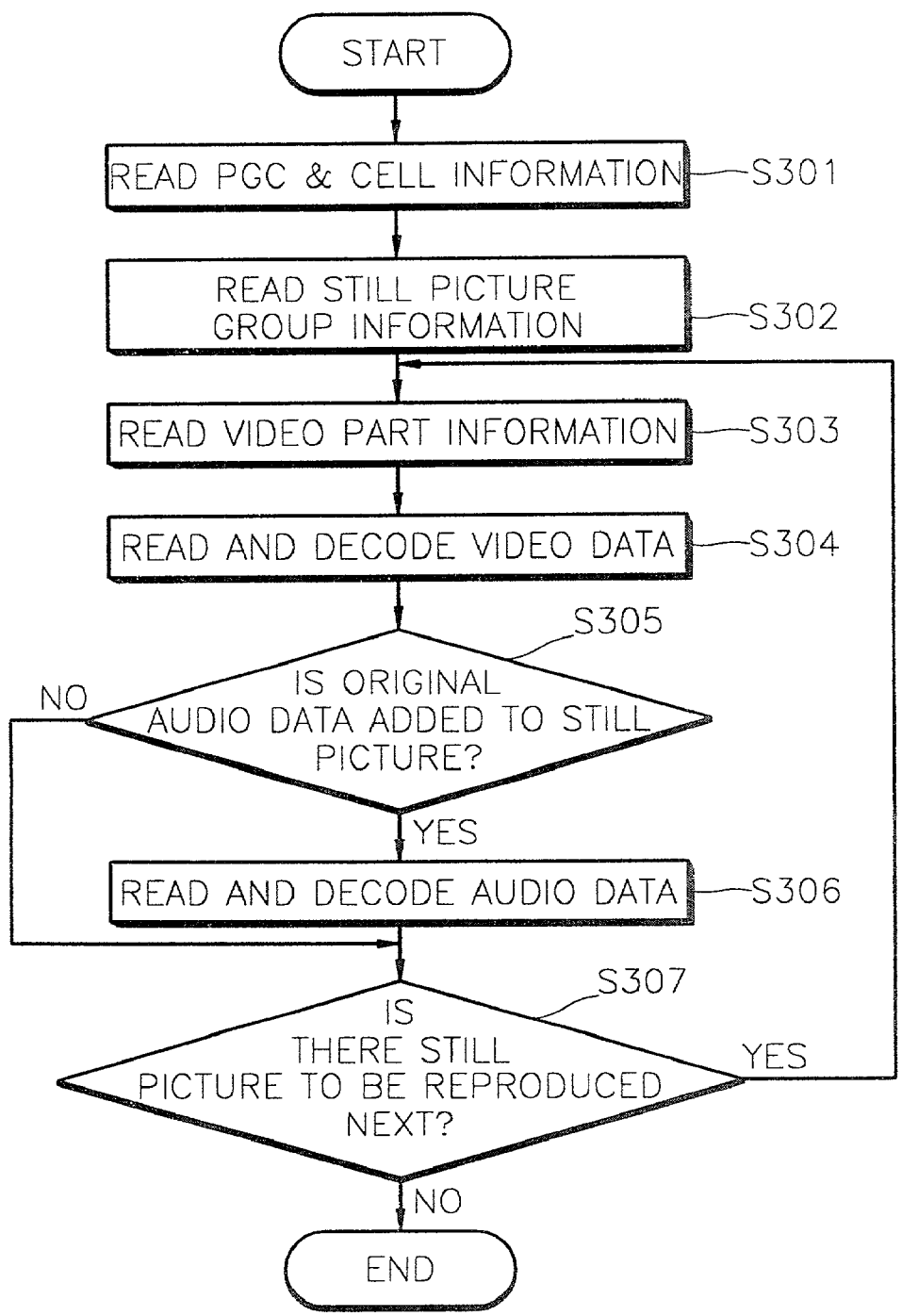
FIG. 27 is a flow chart showing a method for reproducing a still picture according to the first embodiment of the present invention.

FIG. 27 is a flow chart showing a method for reproducing a still picture according to the first embodiment of the present invention, that is, a method for reproducing a still picture and original audio data added thereto. Referring to FIG. 27, PGC information and cell information are read (step S301). Identification information for a still picture group to be reproduced, playback start identification information and playback ending identification information are read from the cell information to read the still picture group information pointed to by the cell (step S302). Video map information for the video part corresponding to the playback start identification information in the read still picture group information is obtained to read the size of a video part, or both video map information and audio map information are obtained in the case of a still picture having original audio data to read the size of a video part and the size of an audio part (step S303).

The position of a desired still picture is calculated by the read video part information and video data located at the calculated position is read and decoded to reproduce the still picture (step S304). Here, the position of a desired still picture is obtained by summing the start position of a still picture group and the size of data preceding the desired still picture. While the still picture is reproduced, it is determined whether original audio data is added to the still picture (step S305). If yes, the original audio data is read and decoded to reproduce the original audio data (step S306). Here, the reading position of the original audio data is obtained by summing the calculated position of the still picture and the size of a video part of the desired still picture. It is checked whether all still pictures belonging to a cell are reproduced or not using the cell information and then it is determined whether or not there is a still picture to be reproduced next (step S307). If yes, the information for the video part of the still picture to be reproduced next is read (step S303).

Otherwise, the procedure is terminated. In the case when there are a plurality of series of cell information, this routine is repeated.

Here, the step of determining whether original audio data is added to a still picture (step S305) may be performed directly after the step of reading the still picture group information (step S302). This is because it is possible to determine that original audio data is added to a still picture in the case when an audio map for an audio part is added subsequently to a video map for a video part, in accordance with the still picture group information.

Figure 28A:
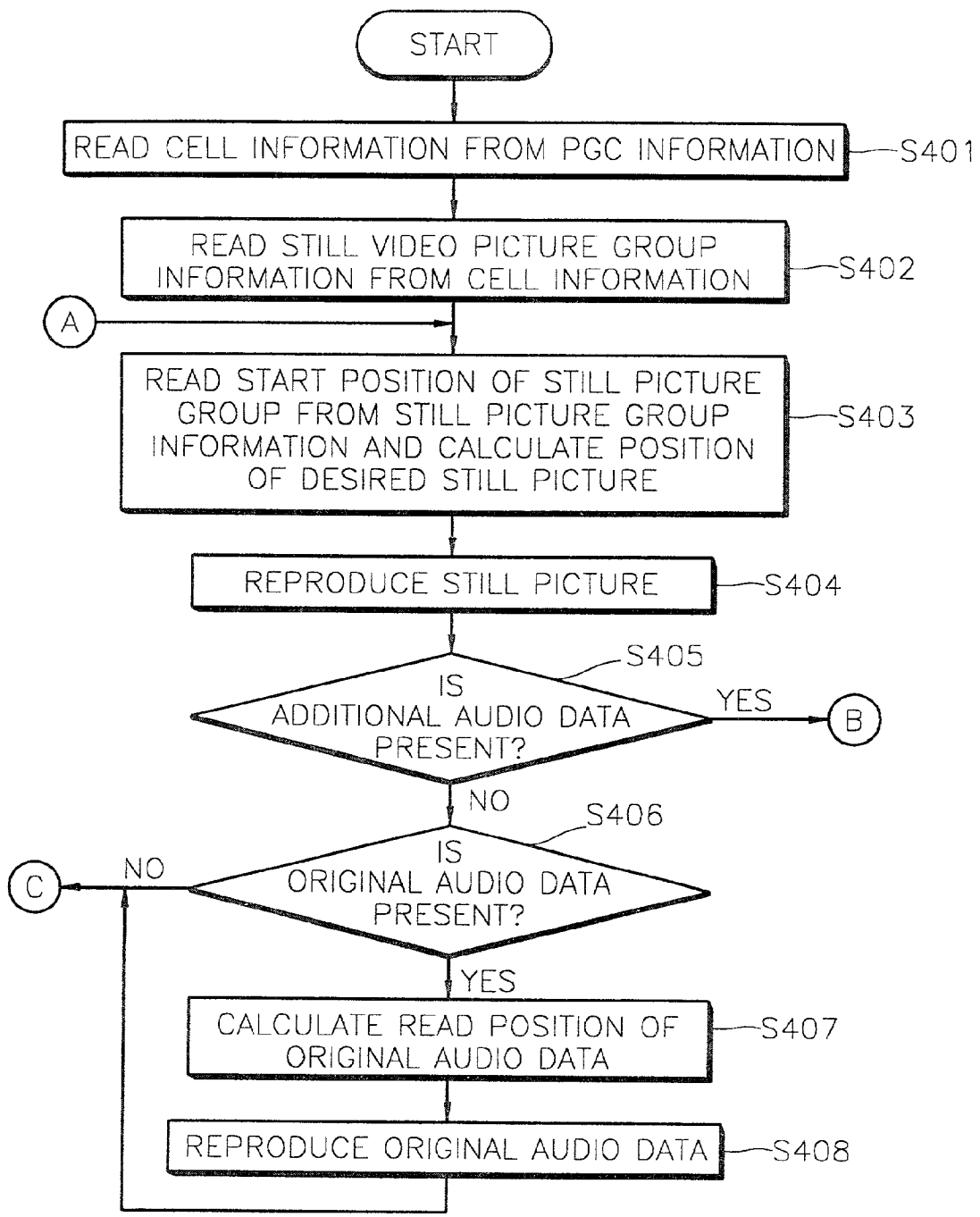
FIGS. 28A and 28B are flowcharts showing a method for reproducing a still picture according to a second embodiment of the present invention.
Figure 28B:
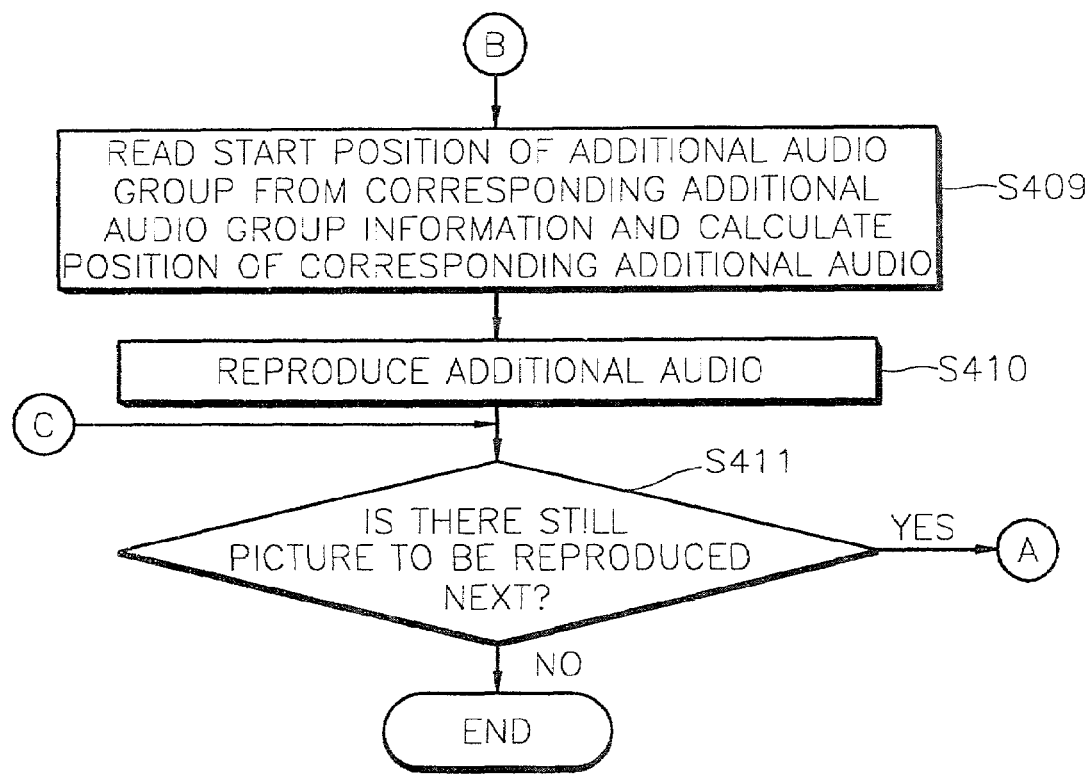

FIGS. 28A and 28B illustrate a flowchart showing a method for reproducing a still picture according to a second embodiment of the present invention, that is, a method for reproducing a still picture, a still picture having original audio data, or a still picture having additional audio data. Referring to FIG. 28A, cell information is read from PGC information (step S401) and then still picture group information pointed to by a cell to be reproduced is read (step 402). Information for the start position of a still picture group is read from the read still picture group information and the position of a desired still picture is calculated (step S403). Here, the position of a desired still picture is obtained by summing the start position of a still picture group and the size of data preceding the desired still picture. The video data is read and decoded in accordance with the position information of the desired still picture to reproduce the still picture (step S404).

It is then checked whether additional audio data is present in the still picture group information or not (step S405). If not, it is checked whether there is original audio data (step S406). Here, the presence of additional audio data in the map information for the video part of the desired still picture to be reproduced can be determined using the identification information for an additional audio group and the identification information for additional audio data. The presence of original audio data can be known by determining whether there is audio information (an audio map) in the map table of the desired still picture to be reproduced.

If there is original audio data in step S406, the read position of the original audio data is calculated (step S407). Here, the read position of the original audio data is obtained by summing the calculated position of the desired still picture and the size of the video part of the desired still picture. Original audio data is read from the calculated position information of the desired still picture and decoded to reproduce the original audio data (step S408) and the procedure proceeds to step S411 as shown in FIG. 28B.

If additional audio data is present in step S405, that is, if the read identification information for the additional audio group designated to the still picture and identification information for the additional audio data are not "0", the start position of the additional audio group is read from the additional audio group information to calculate the position of desired additional audio data (step S409 in FIG. 28B). The position of desired additional audio data is obtained by summing the start position of an additional audio group and the size of the additional audio data preceding the additional audio data having the identification information for the desired additional audio data in the additional audio group.

Additional audio data is read from the calculated position information for the desired additional audio data and is decoded to reproduce the additional audio data (step S410). Then, it is determined whether there is a still picture to be reproduced next (step S411). If yes, the procedure returns to step S403. Otherwise, the procedure is terminated (step S411). In the case of reproducing a plurality of cells, the overall procedure is repeated.

Alternatively, instead of step 405 of determining whether additional audio data is present or not and step 406 of determining whether original audio data is present or not, it is first determined using the still picture group information read in step S402 whether the still picture to be reproduced is a still picture having only a video part, one having original audio data added thereto, or one having additional audio data added thereto. If the still picture has only a video part, steps S403 and S404 are performed. If the still picture has original audio data, steps S403, S404, S407 and S408 are performed. If the still picture has additional audio data, steps S403, S404, S409, S410 and S411 are performed.

Further, according to another aspect of the present invention, before reproduction, a reproduction mode is set by interfacing with a user to determine whether only a still picture is to be reproduced, both a still picture and original audio data are to be reproduced, or both a still picture and additional audio data are to be reproduced.

Figure 29:
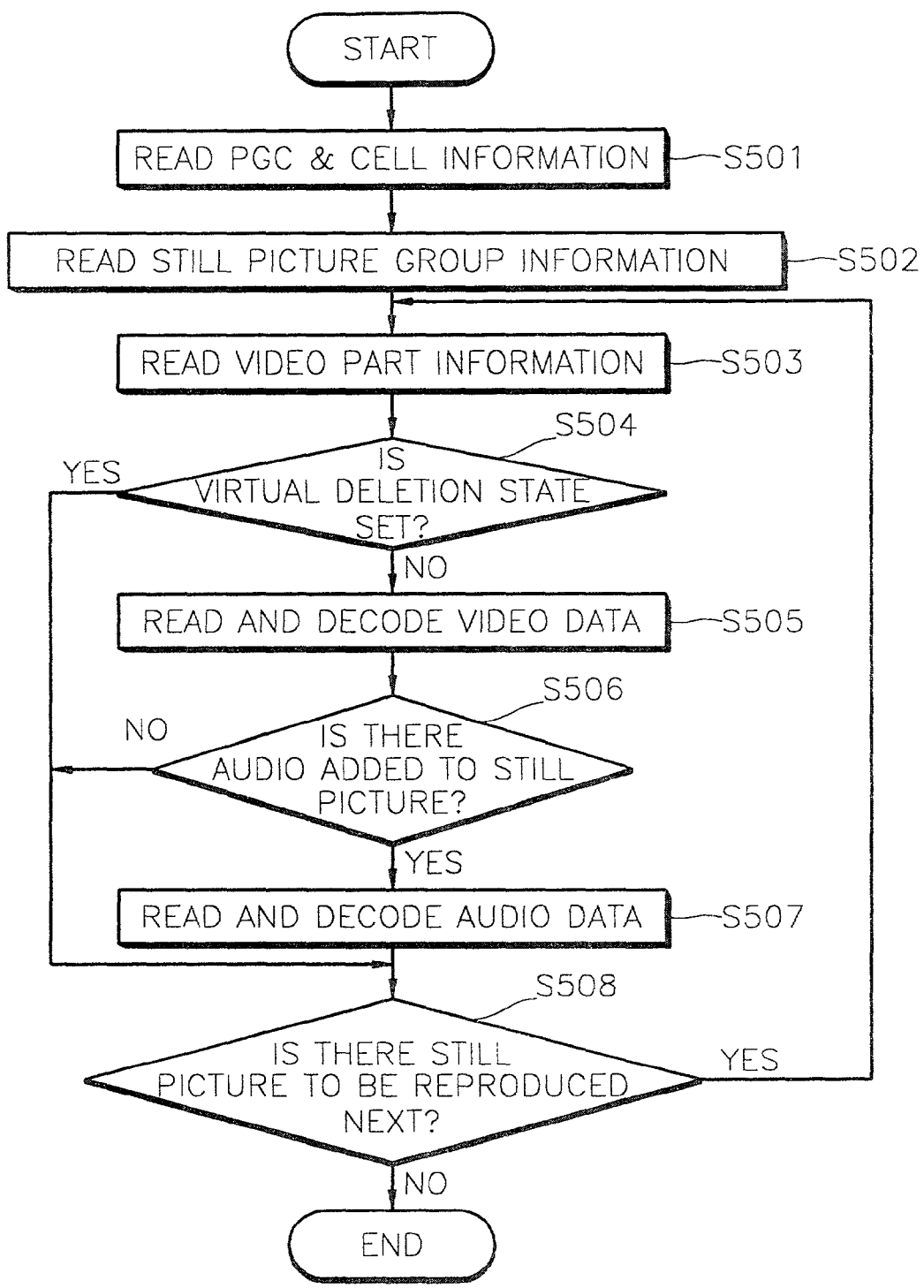
FIG. 29 is a flow chart showing a method for reproducing a still picture according to a third embodiment of the present invention.

FIG. 29 is a flow chart showing a method for reproducing a still picture according to a third embodiment of the present invention, that is, a method for reproducing data in the case when virtual deletion information in a still picture is set to a virtual delete state. Referring to FIG. 29, PGC information and cell information are read (step S501). Identification information for a still picture group to be reproduced, playback start identification information and playback ending identification information are read from the cell information to read the still picture group information pointed to by the cell (step S502). Video map information for the video part corresponding to the playback start identification information in the read still picture group information is obtained to read the size of the corresponding video part and the virtual deletion information (step S503).

When it is determined that the virtual deletion information is set to a virtual delete state, the still picture set to the virtual delete state should not be reproduced. Thus, reproduction is skipped and the procedure proceeds to step S508.

If the virtual deletion information is not set to a virtual delete state in step S504, the position of a desired still picture is calculated by the read video part information and video data located at the calculated position is read and decoded to reproduce the still picture (step S505). Here, the position of the desired still picture is obtained by summing the start position of the still picture group which includes the desired still picture and the size of data preceding the desired still picture. While the still picture is reproduced, it is determined whether audio data is added to the still picture (step S506). If yes, the audio data is read and decoded to reproduce the audio data (step S507). Here, two types of audio data are added to a still picture, that is, original audio data recorded with video data of the still picture and additional audio data added after recording. Either type or both types of audio data may exist. If both types of audio data exist, the additional audio data is automatically reproduced or one type of audio data is selected by a user to then be reproduced.

Here, the read position of the original audio data is obtained by summing the calculated position of the still picture and the size of a video part of the desired still picture. The position of the additional audio data is obtained by summing the start position of the additional audio group indicated by the still picture group information and the size of additional audio data preceding additional audio data having identification information for the additional audio data in the additional audio group information.

It is checked whether all still pictures belonging to a cell have been reproduced or not using the cell information and then it is determined whether or not there is a still picture to be reproduced next (step S508). If yes, the information for the video part of a still picture to be reproduced next is read (step S503). Otherwise, the procedure is terminated. In the case of reproducing a plurality of cells, the overall procedure is repeated.

Figure 30A:
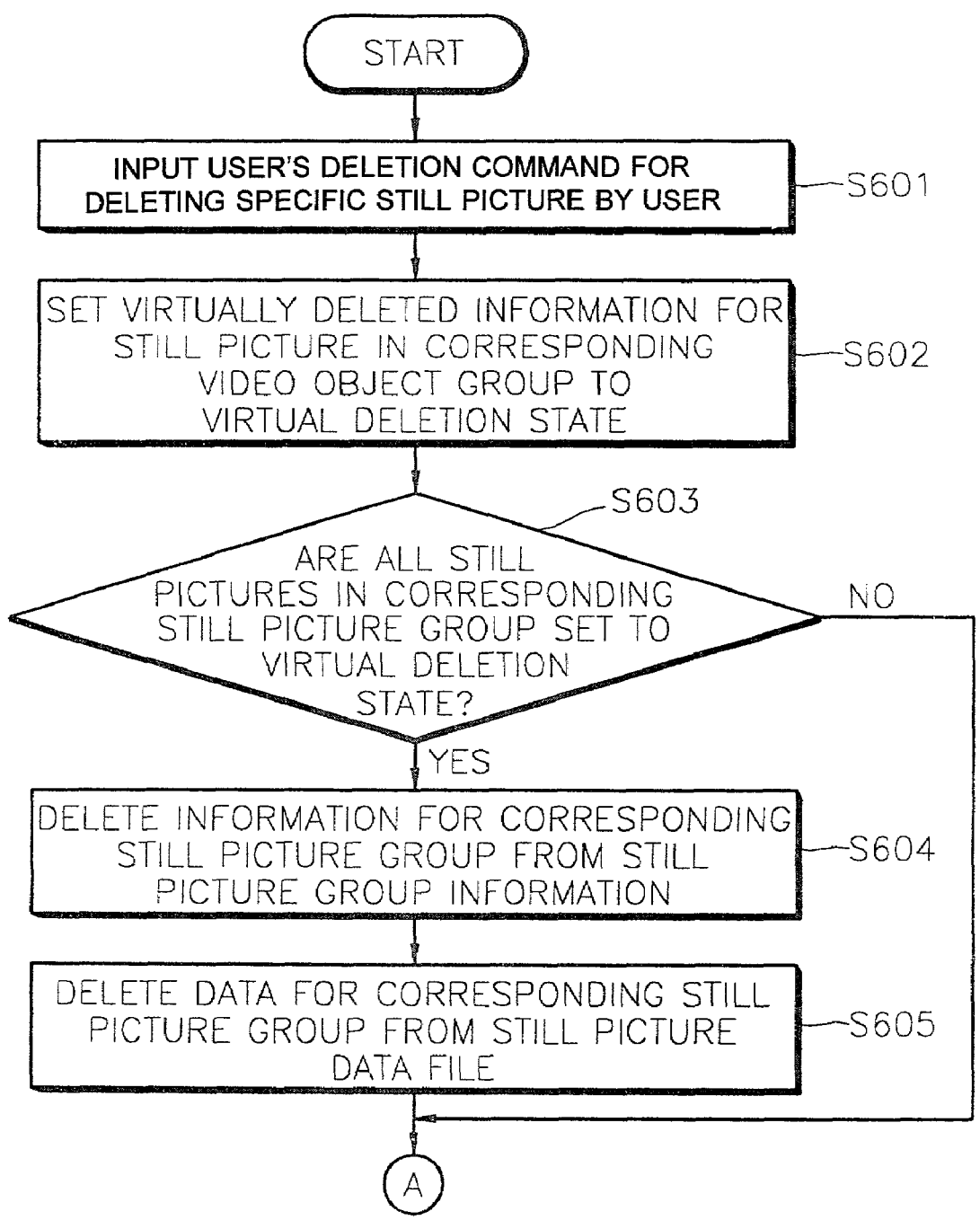
FIGS. 30A and 30B illustrate a flow chart showing a method for deleting data using virtual deletion information according to the present invention.
Figure 30B:
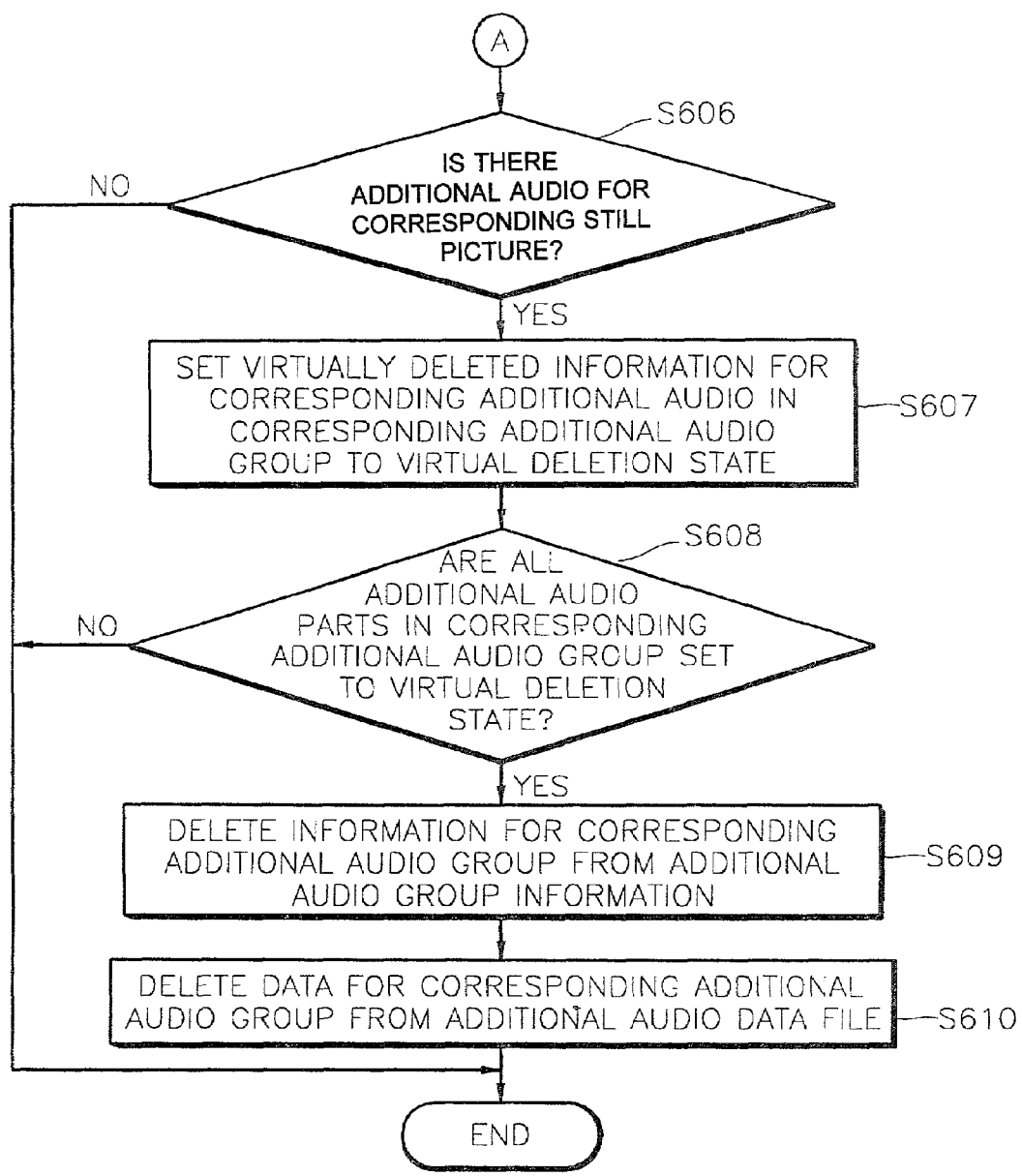

FIGS. 30A and 30B illustrate a flow chart showing a method for deleting data using virtual deletion information according to the present invention, in the case when a user intends to actually delete a specific still picture and/or additional audio data. Referring to FIG. 30, a deletion command for deleting a specific still picture is input by a user (step S601). In accordance with the deletion command, virtual deletion information for a still picture in the corresponding still picture group information is set to a virtual delete state "1" (step S602). It is determined whether virtual deletion information for all still pictures in the corresponding still picture group information is set to a virtual delete state "1" (step S603). If virtual deletion information for all still pictures in the corresponding still picture group information is set to a virtual delete state "1", the corresponding still picture group is actually deleted from the still picture information and the still picture group information is updated (step S604). All of the data in the corresponding still picture group is actually deleted from a still picture data file and the area of the corresponding still picture group is set to a free area (step S605). Other still pictures or moving pictures can be recorded in the free area and this file area is updated in a file system.

It is determined whether the virtually deleted still picture has additional audio data (step S606). If yes, virtual deletion information for additional audio data in the corresponding additional audio group information is set to a virtual delete state "1" (step S607). It is determined whether virtual deletion information for all additional audio parts in the corresponding additional audio group information is set to a virtual delete state "1" (step S608). If virtual deletion information for all additional audio parts in the corresponding additional audio group information is set to a virtual delete state "1", the corresponding additional audio group is actually deleted from the additional audio information and the additional audio group information is updated (step S609). All of the data in the corresponding additional audio group is actually deleted from an additional audio data file (step S610).

As described above, according to the present invention, during reproduction, a virtually deleted still picture is not reproduced, using virtual deletion information. Thus, recording areas can be prevented from being scattered when some data files are deleted at a user's request, thereby avoiding an abrupt increase in file extent information.

Also, original audio data added to a virtually deleted still picture can be virtually deleted using virtual deletion information, and additional audio data corresponding to the still picture can also be virtually deleted. A still picture or additional audio data virtually deleted in units of groups is actually deleted from a file so that a free area for recording new data can be secured.

Further, a large number of still pictures, original audio parts added thereto and additional audio data can be recorded using a minimum amount of information. During reproduction, data can be displayed and edited in units of still pictures. Also, it is possible to confront after-recording of audio data using the additional audio data. Video maps and/or audio maps for still pictures can be formed in a recording order of bitstreams, thereby allowing effective management of information.

What is claimed is:

1. A recording medium for use with a recording and/or reproducing apparatus, the medium comprising:
   a plurality of still pictures;
   virtual deletion information for the still pictures, the apparatus using the virtual deletion to determine whether a corresponding one of the still pictures is currently reproducible upon playback of the recording medium by the apparatus, the virtual deletion information being at least one flag detected by the apparatus; and
   still picture group information used by the apparatus for separating the still pictures into groups, the still picture group information including a start position of each still picture group and sizes of the respective still pictures within the still picture group, a number of still pictures within the corresponding still picture group, and a number of virtually deleted still pictures in the corresponding still picture group.

2. The recording medium according to claim 1, wherein:
   the still picture group information includes video map tables for each of the still pictures, and
   each video map table comprises:
      a type of a video map for a video part,
      a video part identifier,
      the virtual deletion information for the corresponding still picture,
      a size of the video part,
      an information identifier of an additional audio group when the additional audio group exists, and
      an identifier of additional audio data in the additional audio group when the corresponding still picture has additional audio data associated therewith.

3. The recording medium according to claim 1, wherein:
   each still picture comprises a video part,
   at least some of the still pictures comprise an original audio part,
   the original audio parts are recorded consecutively after the corresponding video parts,
   neither the video part nor the original audio part of the corresponding still picture are reproduced by the apparatus when the virtual deletion information thereof is set to the virtual delete state, and
   the still picture group information comprises for each original audio part, a type of an audio map for an audio part, a playback time of the audio part, and a size of the audio part.

4. A recording medium for use with a recording and/or reproducing apparatus, the medium comprising:
   at least one still picture;
   first virtual deletion information for the one still picture, the apparatus using the first virtual deletion information to determine whether the one still picture is currently reproducible upon playback of the recording medium by the apparatus, the first virtual deletion information being at least one flag detected by the apparatus;
   one or more additional audio parts added by the apparatus to the one still picture during playback by the apparatus;
   second virtual deletion information for the additional audio parts, the apparatus using the second virtual deletion information to determine whether a corresponding one of the additional audio parts is currently reproducible by the apparatus, and connective information which the apparatus uses to determine connectivity between still pictures and corresponding additional audio parts during the playback by the apparatus, wherein:

the connectivity information further includes identification information for additional audio groups into which the additional audio parts are grouped and identification information for the additional audio parts in the corresponding additional audio groups, and additional audio group information including additional audio group general information containing the start position of additional audio groups into which the additional audio parts are grouped and information relating to a number of the additional audio parts in each additional audio group, and information for the additional audio parts, the information for the additional audio parts contains position information for the additional audio parts in each additional audio group and the second virtual deletion information for the additional audio parts, and the additional audio group information for each additional audio group includes a type of an audio map for a corresponding one of the additional audio parts, the second virtual deletion information for the additional audio part, a playback time of the additional audio part, and a size of the additional audio part.

* * * * *

UNITED STATES PATENT AND TRADEMARK OFFICE
CERTIFICATE OF CORRECTION

| | |
|---|---|
| PATENT NO. | : 7,283,720 B2 |
| APPLICATION NO. | : 10/137366 |
| DATED | : October 16, 2007 |
| INVENTOR(S) | : Seong-Jin Moon et al. |

It is certified that error appears in the above-identified patent and that said Letters Patent is hereby corrected as shown below:

Title Page, Item (56) References Cited, Foreign Patent Documents, Page 2, change "EP 0545448 8/1993" to --EP 0545446 8/1993--.

Signed and Sealed this

Eighteenth Day of December, 2007

JON W. DUDAS
*Director of the United States Patent and Trademark Office*